US008373888B2

(12) United States Patent
Miyagi et al.

(10) Patent No.: US 8,373,888 B2
(45) Date of Patent: Feb. 12, 2013

(54) PRINTER DRIVER PROGRAM AND IMAGE FORMING APPARATUS

(75) Inventors: Daisuke Miyagi, Chiryu (JP); Noriko Kishibe, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1315 days.

(21) Appl. No.: 12/151,836

(22) Filed: May 8, 2008

(65) Prior Publication Data

US 2008/0291492 A1 Nov. 27, 2008

(30) Foreign Application Priority Data

May 22, 2007 (JP) ................................ 2007-135577

(51) Int. Cl.
*G06K 15/00* (2006.01)
(52) U.S. Cl. ........................ 358/1.18; 358/1.1; 358/1.15
(58) Field of Classification Search ........................ None
See application file for complete search history.

(56) References Cited

U.S. PATENT DOCUMENTS

| | | | | |
|---|---|---|---|---|
| 5,835,920 | A * | 11/1998 | Horton | 715/210 |
| 2006/0156226 | A1* | 7/2006 | Dejean et al. | 715/517 |
| 2007/0273895 | A1* | 11/2007 | Cudd et al. | 358/1.1 |

FOREIGN PATENT DOCUMENTS

| | | | |
|---|---|---|---|
| JP | 07-137390 | | 5/1995 |
| JP | 2001-047683 | | 2/2001 |
| JP | 2002-113919 | | 4/2002 |
| JP | 2006-096016 | | 4/2006 |
| JP | 2006096016 | A * | 4/2006 |
| JP | 2006-164151 | | 6/2006 |
| WO | WO 2005057418 | A1 * | 6/2005 |

* cited by examiner

*Primary Examiner* — Marivelisse Santiago Cordero
*Assistant Examiner* — Kent Yip
(74) *Attorney, Agent, or Firm* — Edwards Wildman Palmer LLP; George W. Neuner

(57) ABSTRACT

A printer driver comprising: a layout determining section that acquires data of a document page (logical page) and determines a layout of one or more printing pages (physical pages) by allocating a content of the logical page; a re-layout determining section that makes determination whether the determined layout includes an combinable pages or not, based on a ratio of a blank area in the physical page and based on presence/absence of continuity in the contents between the page and the immediately preceding physical page or based on an arrangement characteristic of a non-blank area in the physical page, when one logical page is allocated to plural physical pages; and a page combination control section that causes the layout determining section to determine a combined layout by re-allocating the combinable page and immediately preceding physical page to a single physical page based on the determination.

11 Claims, 18 Drawing Sheets

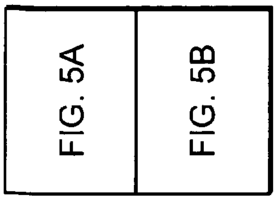
FIG. 5
FIG. 5A
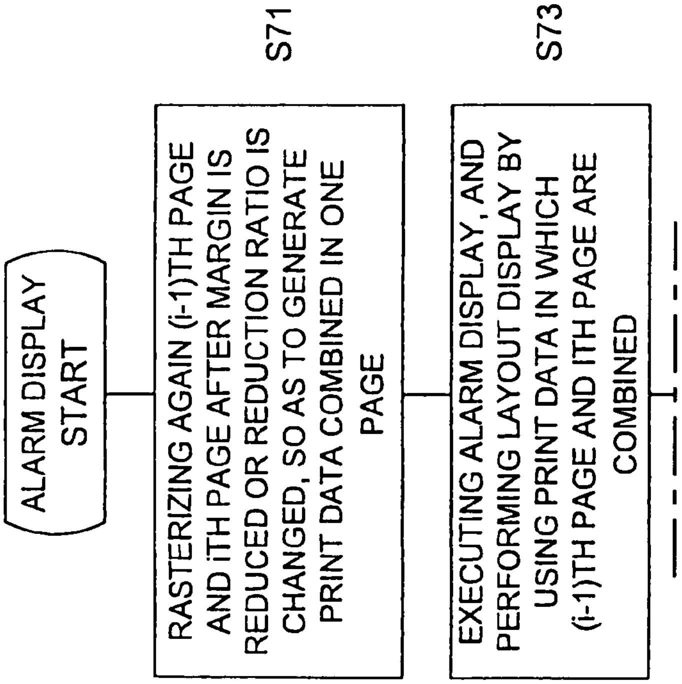

FEATURE OF PRODUCT
COLOR COPY
(High-efficient copy)
This product adopts a newly developed Mycrostoner (registered trademark). Therefore, a fine photograph can be made with breathtaking image quality.

Newly developed MYCROSTONER (registered trademark) that realizes high image quality by which power of expression is conspicuous.

This product adopts a newly developed Mycrostoner for enhancing power of expression and persuasiveness of a full-color document. It realizes high image quality that can truly reproduce even a halftone color or a delicate portion of a man's skin. A fine character or graph can clearly be printed, and a document such as a planning document or resume can be obtained with good finishing.

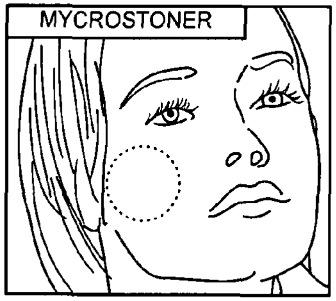

Magnify

A human skin color, which is difficult to be reproduced, can truly be reproduced. A more three-dimensional expression is possible, so that quality of a material can be enhanced.
When a hue in a color printing is changed, adjustment is needed with "image quality adjustment" in system setting.

This product employs toner compatible with oil-less system that can express with clear hue.

This product employs toner compatible with oil-less system that can realize beautiful output. The usability can be enhanced, for example, a user can

IMMEDIATELY PRECEDING PHYSICAL PAGE write a message in a planning sheet or proposal having many graphics or seal the planning sheet or proposal.

PHYSICAL PAGE TO BE PROCESSED

FIG.7A

FEATURE OF PRODUCT

COLOR COPY (High-efficient copy)

This product adopts a newly developed Mycrostoner (registered trademark). Therefore, a fine photograph can be made with breathtaking image quality.

Newly developed MYCROSTONER (registered trademark) that realizes high image quality by which power of expression is conspicuous.

This product adopts a newly developed Mycrostoner for enhancing power of expression and persuasiveness of a full-color document. It realizes high image quality that can truly reproduce even a halftone color or a delicate portion of a man's skin. A fine character or graph can clearly be printed, and a document such as a planning document or resume can be obtained with good finishing.

A human skin color, which is difficult to be reproduced, can truly be reproduced. A more three-dimensional expression is possible, so that quality of a material can be enhanced.

When a hue in a color printing is changed, adjustment is needed with "image quality adjustment" in system setting.

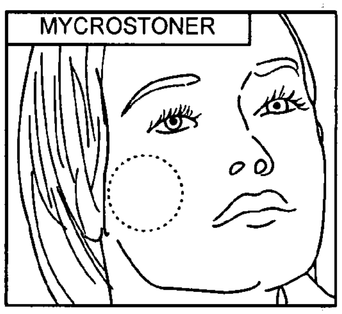

Magnify

This product employs toner compatible with oil-less system that can express with clear hue.

This product employs toner compatible with oil-less system that can realize beautiful output. The usability can be enhanced, for example, a user can write a message in a planning sheet or proposal having many graphics or seal the planning sheet or proposal.

COMBINED PHYSICAL PAGE

FIG.7B

SPECIFICATION OF PRODUCT

| | |
|---|---|
| RELEASE | January, 2007 |
| TYPE | MX-2000F |
| PRICE | 134,000 Yen |
| JAN CODE | 4974019545394 |
| STANDARD EQUIPMENT | Tandem process engine, double-sided printing function, automatic double-sided document feeder (RSPF), SPLC-c printer |
| FIRST COPY TIME | Full-color: 8.9 sec., Monochrome: 6.3 sec. |
| COPY SPEED | Color 18 sheets/min., Monochrome 20 sheets/min. (A4 horizontal) |
| DOCUMENT | Max. A3 sheet/book document |
| PAPER FEED | 2-tray system (550 sheets x 2) + multi-manual tray (100 sheets) = 1200 sheets *2 |
| POWER SUPPLY | AC 100V (50 Hz/60 Hz) |
| POWER CONSUMPTION | Max. 1.45 kW or less |

IMMEDIATELY PRECEDING PHYSICAL PAGE

| | |
|---|---|
| COPY SIZE | A3 wide *3 (305 x 457 mm) ~ A5R, OHP, cardboard, government-printed postcard, envelope (long-type No. 3, western-type No. 2, western-type No. 4)<br>Tray 1-2: (A3/B4/A4/A4R/B5/B5R/A5R),<br>Tray 3-4: (A3/B4/A4/A4R/B5/B5R),<br>Manual feeding tray: (A3 wide <305 x 457 mm> ~ A5R, OHP, cardboard, government-printed postcard, envelope) leading edge of lacked width of not more than 4 mm/trailing edge of not more than 3 mm/total of both sides of not more than 4 mm |

PHYSICAL PAGE TO BE PROCESSED

FIG.8A

SPECIFICATION OF PRODUCT

| | |
|---|---|
| RELEASE | January, 2007 |
| TYPE | MX-2000F |
| PRICE | 134,000 Yen |
| JAN CODE | 4974019545394 |
| STANDARD EQUIPMENT | Tandem process engine, double-sided printing function, automatic double-sided document feeder (RSPF), SPLC-c printer |
| FIRST COPY TIME | Full-color: 8.9 sec., Monochrome: 6.3 sec. |
| COPY SPEED | Color 18 sheets/min., Monochrome 20 sheets/min. (A4 horizontal) |
| DOCUMENT | Max. A3 sheet/book document |
| PAPER FEED | 2-tray system (550 sheets x 2) + multi-manual tray (100 sheets) = 1200 sheets *2 |
| POWER SUPPLY | AC 100V (50 Hz/60 Hz) |
| POWER CONSUMPTION | Max. 1.45 kW or less |
| COPY SIZE | A3 wide *3 (305 x 457 mm) ~ A5R, OHP, cardboard, government-printed postcard, envelope (long-type No. 3, western-type No. 2, western-type No. 4)<br>Tray 1-2: (A3/B4/A4/A4R/B5/B5R/A5R),<br>Tray 3-4: (A3/B4/A4/A4R/B5/B5R),<br>Manual feeding tray: (A3 wide <305 x 457 mm> ~ A5R, OHP, cardboard, government-printed postcard, envelope) leading edge of lacked width of not more than 4 mm/trailing edge of not more than 3 mm/total of both sides of not more than 4 mm |

COMBINED PHYSICAL PAGE

FIG.8B

PHYSICAL PAGE TO BE PROCESSED

RECOMMENDED POINT

△ COLOR COPY
   Highly Efficient Color Copy
△ FAX INTERNET-FAX
   Various Functions
△ COLOR PRINTER
   High Resolution Print
△ NETWORK COLOR SCANNER
   High-performance Network Scanner
△ DOCUMENT SECURITY
   Advanced Security Function
△ DOCUMENT FILING & SHARP OSA
   High Efficient Document Filing and New Functions
△ Paper Handling & Design
   Advanced Paper Feeding System and Design
△ 18 SHEETS PER MINUTE, COLOR OUTPUT WITH HIGH SPEED. HIGH-PERFORMANCE IS CONDENSED IN COMPACT BODY
△ OPTIONS
   Various Options

IMMEDIATELY
PRECEDING PHYSICAL PAGE

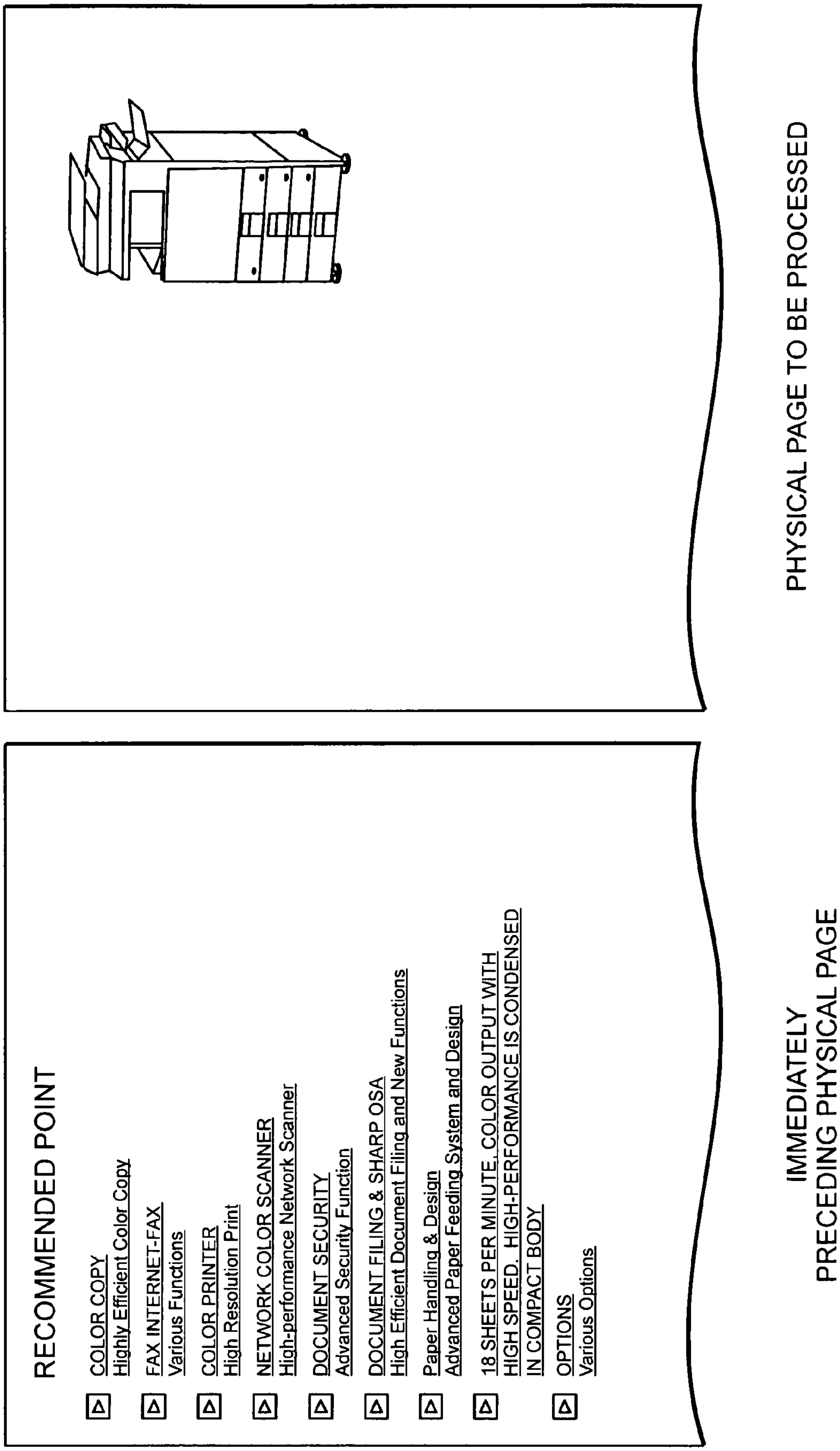

FIG.9A

COMBINED PHYSICAL PAGE

DETERMINING CONTINUITY OF CHARACTER DATA ON THE BASIS OF WHETHER OR NOT THE SENTENCE IN EACH PAGE ENDS IN A PERIOD OR COMMA.

PRINTER DRIVER PROGRAM AND IMAGE FORMING APPARATUS

CROSS-REFERENCE TO RELATED APPLICATION

This application is related to Japanese application No. 2007-135577 filed on May 22, 2007 whose priority is claimed under 35 USC §119, the disclosure of which is incorporated by reference in its entirety.

BACKGROUND OF THE INVENTION

1. Field of the Invention

The present invention relates to a printer driver program having a function of allocating data of a logical page to one or more physical pages, and an image forming apparatus that prints the print data created at the printer driver program.

2. Description of the Related Art

There has been known a function of printing a page (logical page), which is supposed by an application program or a document, as allocated to a page (physical page) determined according to the size of a printing sheet or intention of a user, when the page (logical page) is printed by means of an image forming apparatus. One simple example of a logical page is described below. One worksheet in spreadsheet software corresponds to one logical page. In document composition software having no concept of a page break, such as a text editor, one piece of document data corresponds to one logical page. When the aforesaid worksheet has a great volume having a great number of vertical and lateral columns and this worksheet is to be printed, this might not be able to be printed in one printing sheet (physical page), or it might be unsuitable for printing this worksheet in one printing sheet. In this case, one worksheet is allocated to plural sheets (physical pages) to be printed. The allocating process of the logical page is performed by a printer driver, for example.

However, there may be the case in which the extra page that is not intended by a user is printed by the aforesaid allocating function. One example of this case is a page in which only a ruled line of a table, which is out of range of one physical page, is printed. Another example is the case in which print data having one line or several lines whose characters are not correctly translated is printed over plural pages, because the process of the print data is not correctly performed at a host or a communication error occurs. There is no special determination made for the content of the respective physical pages, even if they are the pages not intended by a user. Therefore, printing process might be carried out, and hence, printing sheets or toner might be wastefully consumed.

As a technique relating to the above-mentioned case, there has been known a technique in which, when a ratio of a blank portion occupied in a page to be printed is higher than a predetermined value, this page is determined to be a blank sheet, and an alarm is issued for reducing the printing of an extra page (e.g., Patent Document 1: Japanese Unexamined Patent Application No. 2006-164151).

However, in the determination on the basis of only the ratio of the blank portion, an alarm might be issued, even if a user intends to print this page. Therefore, a technique capable of determining whether an alarm should be issued or not according to the content of the respective physical pages has been demanded.

Taking again the aforesaid worksheet as an example, a user generally sets such that he/she adjusts the margin setting of the physical page or the reduction ratio of the image in order not to create the out-of-range portion, and then, performs again the printing process, rather than a user does not print only the page on which the ruled line is only printed. However, the operation of re-printing not only wastes a printing sheet or toner, but also is a troublesome operation that wastes user's time. A technique capable of determining whether or not the out-of-range portion is combinable within one page before the printing is outputted has been demanded. Further, a technique capable of propose the combinable layout has been demanded.

SUMMARY OF THE INVENTION

The present invention is accomplished in view of the foregoing circumstance, and aims to provide a technique capable of determining whether or not an out-of-range portion is combinable within one page before a printing is outputted, and capable of combining the out-of-range portion within one page, when the out-of-range portion is combinable.

The present invention provides a program that provides a function as a printer driver for an information processing apparatus, the printer driver including: a layout determining section that acquires data of a document page (logical page) from an application program and determines a layout of one or more printing pages (physical pages) by allocating contents of the logical page represented by the acquired data to the physical page(s); a re-layout determining section that determines whether the determined layout includes an combinable physical page or not, the combinable physical page being capable of being combined with an immediately preceding physical page, based on whether a blank coverage ratio defined as a ratio of a blank area in the physical page exceeds a predetermined threshold value or not and based on presence/absence of continuity in contents between the physical page and the immediately preceding physical page or based on an arrangement characteristic of a non-blank area in the physical page, when one logical page is allocated to plural physical pages; a page combination control section that causes the layout determining section to determine a combined layout by re-allocating the contents of the combinable physical page and the immediately preceding physical page into a single physical page when the re-layout determining section determines that the determined layout includes the combinable physical page; a print data generating section for generating print data of the physical page(s) based on the determined layout or the combined layout, and a communication section for transmitting the generated print data to an external image forming apparatus connected via communication.

Further, from a different point of view, the present invention provides an information processing apparatus with a function of generating print data including: a layout determining section that acquires data of a document page (logical page) from an application program and determines a layout of one or more printing pages (physical pages) by allocating contents of the logical page represented by the acquired data to the physical page(s); a print data generating section for generating print data of the physical page(s) based on the layout of the physical page(s); a communication section for transmitting the generated print data to an external image forming apparatus connected via communication; a re-layout determining section that determines whether an interruption of generating print data is carried out or not, on the physical page whose blank coverage ratio calculated as a ratio of a blank area in the physical page is over a predetermined threshold value, based on the presence/absence of continuity in contents between the combinable physical page and the immediately preceding physical page or based on the an arrangement characteristic of a non-blank region area in the combinable physical page, when one logical page is allocated to plural physical pages; and a page combination control section that controls so as to causes the layout determining section to determine a combined layout that is obtained by re-allocating the contents of the physical page and the immediately preceding physical page into a single physical page, to cause the print data generating section to generate a combined print data based on the combined layout, and to cause the communication section to transmit the combined print data, when the re-layout determining section determines an interruption of generating print data.

Moreover, the present invention provides an image forming apparatus including: a communication section that is connected via communication to an information processing apparatus in which a printer driver determines a layout of one or more printing pages (physical pages) by allocating contents of a document page (logical page) represented by data acquired from an application program to one or more printing pages (physical pages) and generates print data for every physical page, and receives the print data generated by the printer driver; a re-layout determining section that determines whether the determined layout includes a combinable physical page or not, the combinable physical page being capable of being combined with an immediately preceding physical page, based on whether a blank coverage ratio defined as a ratio of a blank area in the physical page and based on presence/absence of continuity in contents between the physical page and the immediately preceding physical page or based on an arrangement characteristic of a non-blank area in the physical page, when one logical page is allocated to plural physical pages; a page combination control section that demands of the printer driver to generate combined print data based on a combined layout that is obtained by re-allocating the contents of the combinable physical page and the immediately preceding physical page to a single physical page, and exercises control to receive the generated combined print data from the printer driver and print the same when the re-layout determining section determines that the determined layout includes the combinable physical page.

As mentioned above, the printer driver program according to the present invention provides the function as a printer driver, the printer driver including: the re-layout determining section that determines whether the determined layout includes an combinable physical page or not, the combinable physical page being capable of being combined with an immediately preceding physical page, based on whether a blank coverage ratio defined as a ratio of a blank area in the physical page exceeds a predetermined threshold value or not and based on presence/absence of continuity in contents between the physical page and the immediately preceding physical page or based on an arrangement characteristic of a non-blank area in the physical page, when one logical page is allocated to plural physical pages; and the page combination control section that causes the layout determining section to determine a combined layout by re-allocating the contents of the combinable physical page and the immediately preceding physical page into a single physical page when the re-layout determining section determines that the determined layout includes the combinable physical page; a print data generating section for generating print data of the physical page(s) based on the determined layout or the combined layout. Therefore, before the printing is outputted, it is determined whether or not the out-of-range portion can be combined with one page, and when it is combinable, the out-of-range portion can be combined in one page. Accordingly, the present invention can prevent the inconvenience that a page that is not demanded by a user might unnecessarily be printed. It is the same as the image forming apparatus of the present invention.

The logical page means here a region that is supposed to be one page on an application program. For example, one worksheet corresponds to one logical page in Microsoft Excel (registered trademark) that is one of spreadsheet software.

The physical page means a page that is supposed to be printed as one page. In the example of the aforesaid Excel, a large worksheet is printed as divided into plural sheets, when it does not fall within a designated size, e.g., within an A4 size sheet, wherein the content of the printing corresponding to each sheet is the physical page.

The blank region is the region having no pixels that should be printed, i.e., the base region.

According to another aspect, the image forming apparatus according to the present invention includes: the re-layout determining section that determines whether the determined layout includes an combinable physical page or not, the combinable physical page being capable of being combined with the an immediately preceding physical page, based on a blank coverage ratio defined as a ratio of a blank area to a total area of the combinable physical page and based on the presence/absence of continuity in contents between the combinable physical page and the immediately preceding physical page or based on the an arrangement characteristic of a non-blank region area in the combinable physical page, when one logical page is allocated to plural physical pages; and the page combination control section that causes the layout determining section to determine a combined layout by re-allocating the contents of the combinable physical page and the immediately preceding physical page into a single physical page when the re-layout determining section determines that the determined layout includes the combinable physical page. Therefore, before the printing is outputted, it is determined whether or not the out-of-range portion can be combined with one page, and when it is combinable, the out-of-range portion can be combined in one page. Accordingly, the present invention can prevent the inconvenience that a page that is not demanded by a user might unnecessarily be printed.

The preferable aspects of the program according to the present invention will be explained below.

When the combinable physical page and the immediately preceding physical page contain character data, the re-layout determining section may determine the presence of continuity in the case that the end of the character data in the immediately preceding physical page is a break of a sentence or a clause. In this manner, the presence of the continuity of the current page and the preceding page can be determined.

Alternatively, when the combinable physical page and the immediately preceding physical page contain segment data, the re-layout determining section may estimate whether or not the segment data pieces in both the pages are ruled lines, and when it estimates that the segment data pieces are ruled lines, it checks a degree of coincidence in the arrangement in a vertical direction and a horizontal direction so as to determine the presence/absence of continuity on the basis of the result. In this manner, the presence of the continuity of the current page and the preceding page can be determined.

Further, the information processing apparatus may include: an instruction acquiring section that acquires an instruction from a user; and a display section that can display the layout of the physical page corresponding to the generated print data, the layout determining section acquires the data of the logical page in response to acquisition of the instruction for printing by the instruction acquiring section, the page combination control section may cause the display section to display the combined layout so as to prompt the user to issue the instruction as to whether or not to perform the printing with the combined layout, and when the instruction for performing the printing with the combined layout is acquired, the page combination control section may exercise control to cause the communication section to transmit print data based on the combined layout in response to the instruction, while when the instruction for not performing the printing with the combined layout, it may exercise control to cause the communication section to transmit the print data based on the layout determined for each physical page before the determination of the combined layout. With this configuration, it can be confirmed whether or not the combined layout is in accordance with the intension of a user before the printing, whereby the layout in accordance with the user's intension can be printed. Further, the labor of the user for resetting the margin or reduction ratio can be saved.

Further, the layout determining section may carry out the re-layout with a margin of the target physical page set to be smaller, or may carry out the re-layout with the magnification of an image in the target physical page more reduced, upon determining the combined layout. In this manner, the pages can be combined.

Moreover, the page combination control section may cause the layout determining section to determine plural combined layouts, each having different margin setting or different magnification of an image, cause the print data generating section to generate combined print data corresponding to each of the combined layouts, cause the display section to display the combined layouts so as to prompt the user to select any one of the combined layouts, and cause the communication section to transmit the combined print data corresponding to the combined layout selected by the user. With this configuration, the user can select the one that is the most suitable for the user's intension from the proposed candidates, and the selected one can be printed.

Further, the present invention may be the page combination control section may cause printing only of the physical page corresponding to the combined layout selected by the user, and then, cause the display section to display a message for prompting the user to select consent or re-selection, and when the instruction acquiring section acquires the instruction for performing the re-selection, the page combination control section may control the display section to display again each of the combined layouts. With this configuration, only the physical page that is the subject of the combination is printed, its finish is confirmed by a user, and according to need, the user can make re-selection. Therefore, the optimum layout can quickly be determined without wastefully printing the other physical pages.

Moreover, the program may further include a chapter dividing function that allows, when a subject to be printed is composed of plural logical pages, a user to designate whether or not each of the logical pages is a head of a chapter indicating a substantial break of a text, or that causes a computer to identify whether or not each of the logical pages is a head of a chapter by using the data of each of the logical pages, and the page combination control section may exercise control such that the physical page to which the head of each chapter is allocated is excluded from the subject for determining the layout combined with the immediately preceding physical page. With this configuration, the page that is the end of the chapter and the page that is the head of the next chapter are not combined, in the subjects to be printed that are divided into chapters, so that the subjects to be printed can be printed in which the chapters are surely be divided.

The various preferable aspects can be combined to each other.

The preferable aspects of the image forming apparatus according to the present invention will be explained below.

In the image forming apparatus of the present invention, when the combinable physical page and the immediately preceding physical page contain character data, the re-layout determining section may decide the presence of continuity in the case that the end of the character data in the immediately preceding physical page is a break of a sentence or a clause. In this manner, the presence of the continuity of the current page and the preceding page can be determined.

Alternatively, when the combinable physical page and the immediately preceding physical page contain segment data, the re-layout determining section may estimate whether or not the segment data pieces in both the pages are ruled lines, and when it estimates that the segment data pieces are ruled lines, it may check a degree of coincidence in the arrangement in a vertical direction and a horizontal direction so as to determine the presence/absence of continuity on the basis of the result. In this manner, the presence of the continuity of the current page and the preceding page can be determined.

Further, the image forming apparatus of the present invention may further includes: an instruction acquiring section that acquires an instruction from a user; and a display section that can display the layout of the physical page corresponding to the received print data, wherein the page combination control section may cause the display section to display the combined layout so as to prompt the user to issue the instruction as to whether or not to perform the printing with the combined layout, and when the instruction for performing the printing with the combined layout is acquired, the page combination control section may exercise control to demand of the printer driver to generate combined print data that is generated based on the combined layout in response to the instruction, receive the generated combined print data from the printer driver, and print the combined print data, while when the instruction for not performing the printing with the combined layout is acquired, the page combination control section may exercise control to print the print data, which has already been received, without demanding the combined print data of the printer driver. With this configuration, it can be confirmed whether or not the combined layout is in accordance with the intension of a user before the printing, whereby the layout in accordance with the user's intension can be printed. Further, the labor of the user for resetting the margin or reduction ratio can be saved.

Further, the printer driver may carry out the re-layout with a margin of the target physical page set to be smaller, or carry out the re-layout with the magnification of an image in the target physical page more reduced, upon determining the combined layout.

Moreover, the page combination control section may cause the printer driver to generate plural combined print data pieces, each having different margin setting or different magnification of an image, cause the display section to display each of the combined layouts so as to prompt a user to select any one of the combined layouts, and exercise control to print the combined print data corresponding to the selected combined layout. With this configuration, the user can select the one that is the most suitable for the user's intension from the proposed candidates, and the selected one can be printed.

Further, the present invention may be the page combination control section may cause printing only of the physical page corresponding to the combined layout selected by the user, and then, cause the display section to display a message for prompting the user to select consent or re-selection, and when the instruction acquiring section acquires the instruction for performing the re-selection, the page combination control section may control the display section to display again each of the combined layouts. With this configuration, only the physical page that is the subject of the combination is printed, its finish is confirmed by a user, and according to need, the user can perform the re-selection. Therefore, the optimum layout can quickly be determined without wastefully printing the other physical pages.

Moreover, the image forming apparatus may further include a chapter dividing function that allows, when the subject to be printed is composed of plural logical pages, a user to designate whether or not each of the logical pages is a head of a chapter, or that identifies whether or not each of the logical pages is a head of a chapter by using the data of each of the logical pages, wherein the page combination control section may exercise control such that the physical page to which the head of each chapter is allocated is excluded from the subject for determining the layout combined with the immediately preceding physical page. With this configuration, the page that is the end of the chapter and the page that is the head of the next chapter are not combined, in the subjects to be printed that are divided into chapters, so that the subjects to be printed can be printed in which the chapters are surely be divided.

The various preferable aspects can be combined to each other.

BRIEF DESCRIPTION OF THE DRAWINGS

FIGS. 7A and 7B are explanatory views showing an example of layouts according to the present invention when pages are combined as a result of a determination of continuity on the basis of a text region;

FIGS. 8A and 8B are explanatory views showing an example of layouts according to the present invention when pages are combined as a result of a determination of continuity on the basis of a segment;

FIGS. 9A and 9B are explanatory views showing an example of the case in which color pixels to be printed are present in a part of a logical page, the color pixels having an area less than or equal to a predetermined area according to the present invention.

DETAILED DESCRIPTION OF THE PREFERRED EMBODIMENTS

The present invention will be described in detail below with reference to the drawings. The description below is only illustrative, and it should not be construed that the present invention is limited by the description below.

<Functional Configuration of Information Processing Apparatus and Image Forming Apparatus>

Figure 1:
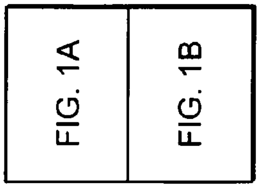
FIG. 1 is a block diagram showing an example of functional configurations of an information processing apparatus in which a printer driver according to the present invention is operated and an image forming apparatus.
Figure 1A:
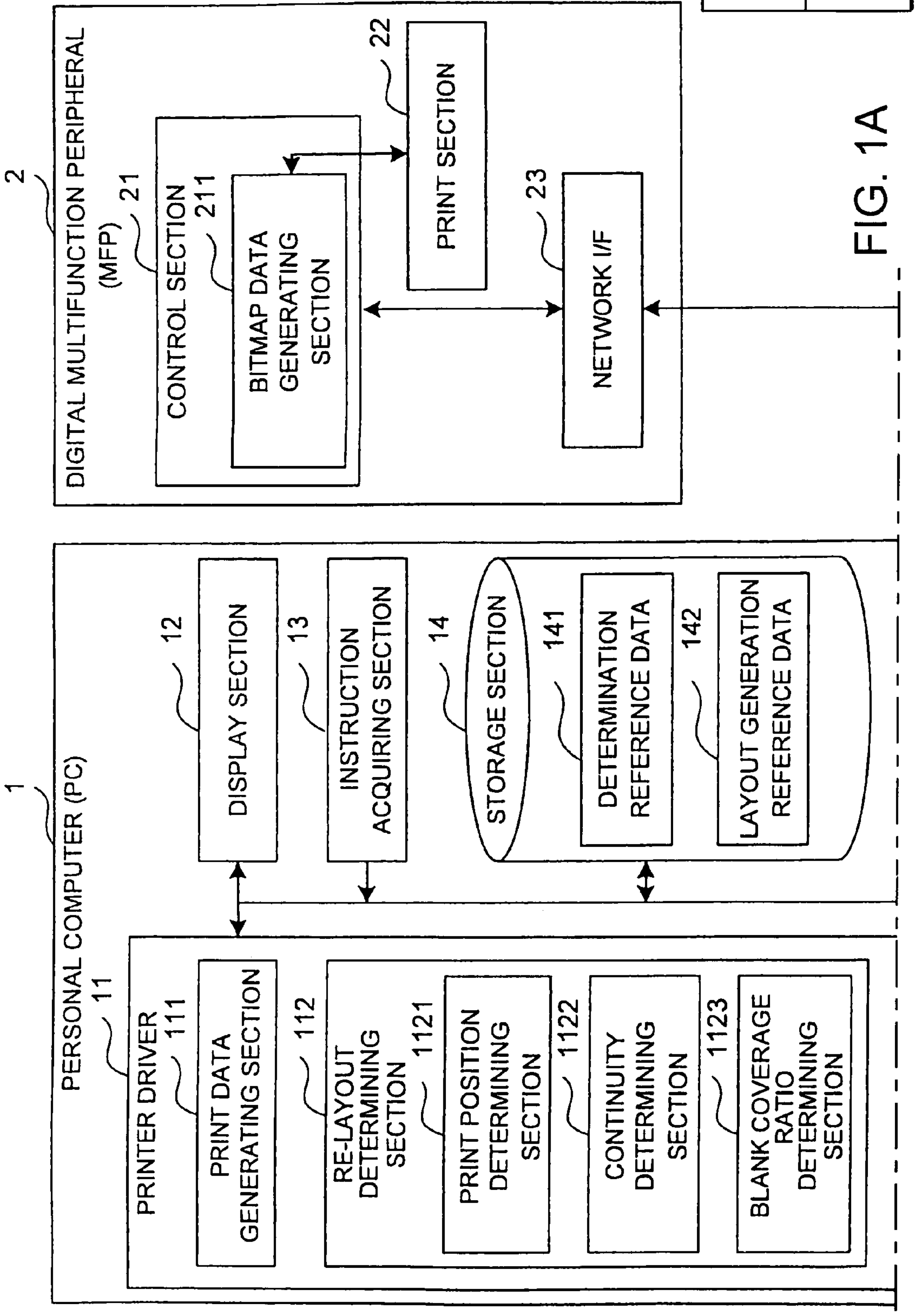
Figure 1B:
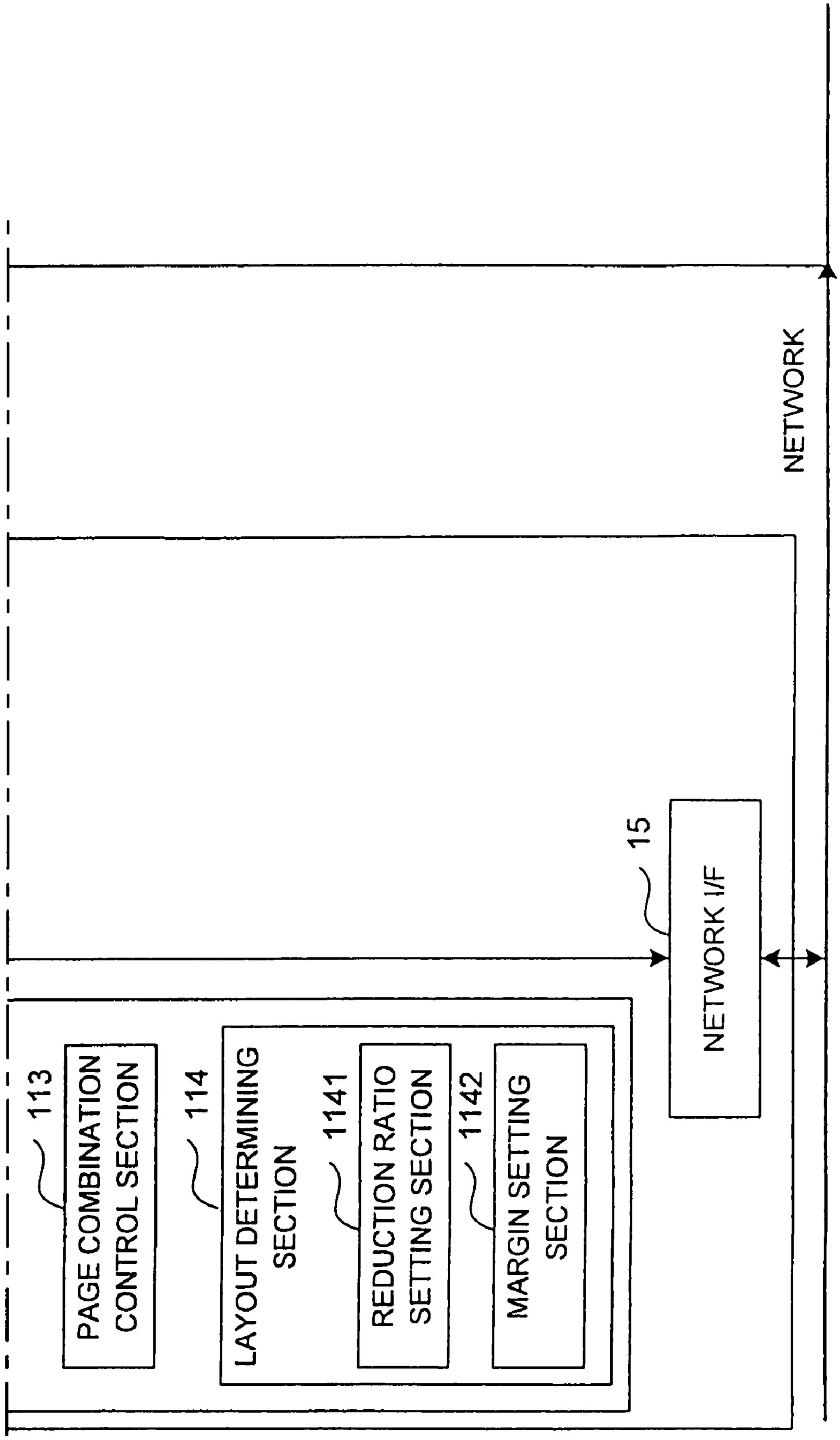
Figure 2:
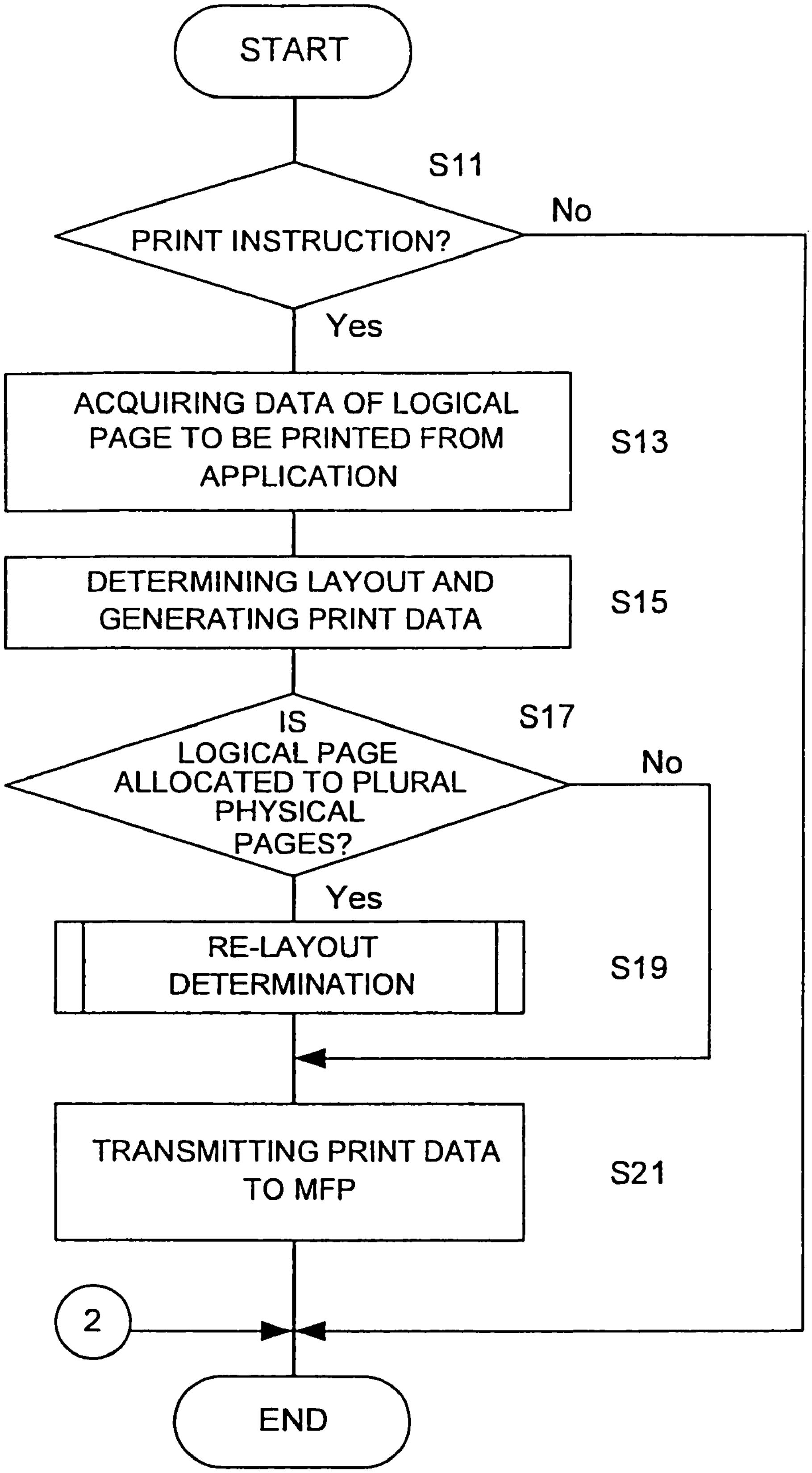
FIG. 2 is a first flowchart showing an example of a procedure of processes of the printer driver according to the present invention.

FIG. 1 is a block diagram showing an example of functional configurations of an information processing apparatus in which a printer driver according to the present invention is operated and an image forming apparatus. A personal computer (PC) 1 in FIG. 1 corresponds to the information processing apparatus. A digital multifunction peripheral (MFP) 2 in FIG. 1 corresponds to the image forming apparatus. The personal computer 1 and the digital multifunctional peripheral 2 are connected to each other via network. A printer driver program 11 is installed to the personal computer 1, wherein the function of the printer driver is realized by the execution of the program by a CPU.

The characteristic function of the printer driver 11 according to the present invention lies in a print data generating section 111, re-layout determining section 112, page combination control section 113, and layout determining section 114. The re-layout determining section 112 includes a print position determining section 1121, continuity determining section 1122, and blank coverage ratio determining section 1123. The layout determining section 114 includes a reduction ratio setting section 1141 and/or margin setting section 1142. A storage section 14 stores determination reference data 141, and layout generation reference data 142.

The personal computer 1 includes a display section 12, instruction acquiring section 13, the storage section 14, and a network I/F section 15. Specifically, the display section 12 is a display device, the instruction acquiring section 13 is a keyboard and a mouse, the storage section 14 is a semiconductor memory device and a hard disk device, and the network I/F section 15 is a circuit mounted to a LAN card of Ethernet.

The digital multifunction peripheral 2 includes a control section 21, a print section 22, and a network I/F section 23. The control section 21 includes a bitmap data generating section 211.

When a user instructs the printing operation by using the instruction acquiring section 13 during the execution of an unillustrated application program, the printer driver 11 acquires the data of the logical page from the application program. The layout determining section 114 allocates the acquired data of the logical page to a physical page, and determines the content that should be printed on the physical page. The print data generating section 111 rasterizes the data of each physical page according to the determined content so as to produce print data. The user can preview the layout of the rasterized physical page on the display section 12. This is called a preview window or preview screen.

The re-layout determining section 112 calculates a blank coverage ratio of each physical page. A specific manner of calculating the blank coverage ratio is to calculate the ratio of the area occupied by a blank portion (base portion) in all printing areas in the physical page. In order to obtain the blank coverage ratio from the rasterized print data, the number of color pixels (the number of pixels that are not white pixels) in the image whose resolution is reduced for the preview screen and that is binarized may be counted and the ratio of this number to the total pixel numbers may be calculated. The blank coverage ratio thus calculated is compared to a threshold value (determination reference data 141) set beforehand. This is the function of the blank coverage ratio determining section 1123. When the blank coverage ratio exceeds the threshold value, the re-layout determining section 112 determines whether or not the physical page should be combined with the preceding physical page. It is to be noted that this determination is made only when one logical page is divided into plural physical pages. The head physical page is excluded from the targets for the determination, since the preceding page is not present for the head physical page.

The print position determining section 1121 and the continuity determining section 1122 perform the determination as to whether or not the physical page, having the blank coverage ratio exceeding the threshold value, is combined with the preceding physical page. The print position determining section 1121 obtains the arrangement of color pixels in the physical page. Then, it determines whether or not the color pixels are dispersed as a whole or the color pixels are gathered on some area, by using a predetermined reference (layout generation reference data 142). The continuity determining section 1121 determines whether or not the character data contained in the physical page whose toner coverage ratio exceeds the threshold value and the character data contained in the preceding physical page have continuity. Alternatively, it determines whether or not the segment data contained in the physical page whose toner coverage ratio exceeds the threshold value and the character data contained in the preceding physical page are ruled lines. As for the estimation of the ruled line of a table, briefly speaking, plural parallel segments extending in the longitudinal direction and lateral direction are estimated to be ruled lines of a table. In this case, if the X coordinate or Y coordinate of the segment in the preceding or next physical page correspond to the segments, it is determined that there is continuity in the table.

More specifically, a ruled line of a table in an image may be estimated by applying a known method described below. For example, a frequency distribution of dots in the other direction at each position along at least one direction of the horizontal direction and vertical direction may be obtained from an input image, and a ruled line may be determined on the basis of the slope of the frequency distribution, in order to identify the ruled line mixedly present in characters (e.g., see Japanese Unexamined Patent Application No. HEI8-272895). Further, for example, a frequency distribution of lines in a main scanning direction or sub-scanning direction of a read document may be obtained to set a threshold value on the basis of the frequency distribution, and a ruled line may be identified on the basis of the threshold value (e.g., see Japanese Unexamined Patent Application No. 2000-163571).

When it is determined that there is continuity in the pages, the page combination control section 113 controls to re-allocate the physical page whose blank coverage ratio exceeds the threshold value and the preceding physical page to a single physical page by reducing more the margin or reducing more the image. That is, it issues an instruction to the layout determining section 114 so as to determine the layout of the target physical page with a different margin setting or different reduction ratio. The layout determining section 114 that receives the instruction calculates, for example, the reduction ratio for combining the target physical pages into one page at the reduction ratio setting section 1141. Alternatively, the layout determining section 114 determines the margin setting for combining the target physical pages into one page at the margin setting section 1142. The target physical pages may be combined into one page by using both of the reduction ratio setting section 1141 and the margin setting section 1142. Then, the print data generating section 111 generates print data with a new margin setting and/or new reduction ratio. The newly generated print data can be previewed on the display section 12.

Next, a digital multifunction peripheral 2 will be explained. The digital multifunction peripheral according to the present invention includes a control section 21, a print section 22, and a network I/F 23. The digital multifunction peripheral 2 receives the print data generated at the printer driver 11 through the network I/F 23. The received print data is converted into data that is printable by the print section 22. The bitmap data generating section 211 performs the conversion. The print section 22 prints the converted print data on a printing sheet. The control section 21 functions as the bitmap data generating section 211, and further controls the entire operation of the digital multifunction peripheral 2. Specifically, the digital multifunction peripheral 2 is an electrophotographic full-color multifunction peripheral. The digital multifunction peripheral 2 may be a monochrome apparatus, not a full-color apparatus, and further, it may be a device of an ink-jet type or a sublimation type, not the electrophotographic type. The image forming apparatus may not be a multifunction peripheral, but a printer or the like having a single function. The control section 21 includes a CPU, wherein the function of the bitmap data generating section 211 is realized by the execution of the control program by the CPU.

The connection manner of the personal computer 1 and the digital multifunction peripheral 2 is not limited to the network. They may be connected by one-to-one communication line, such as an USB.

Figure 6:
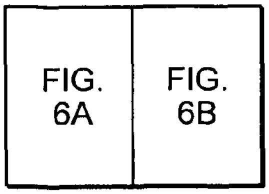
FIG. 6 is a block diagram showing a different example of functional configurations of an information processing apparatus in which a printer driver according to the present invention is operated and an image forming apparatus.
Figure 6A:
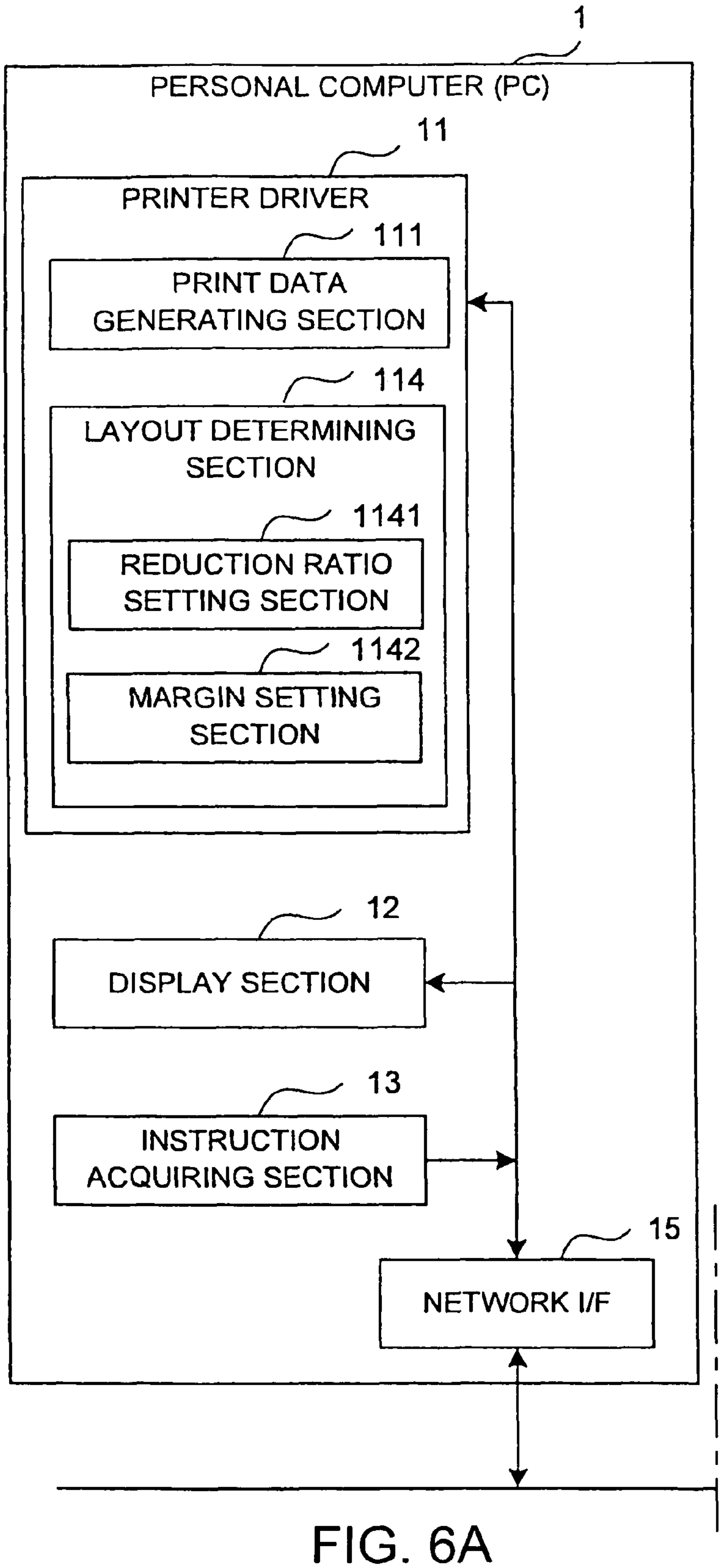
Figure 6B:
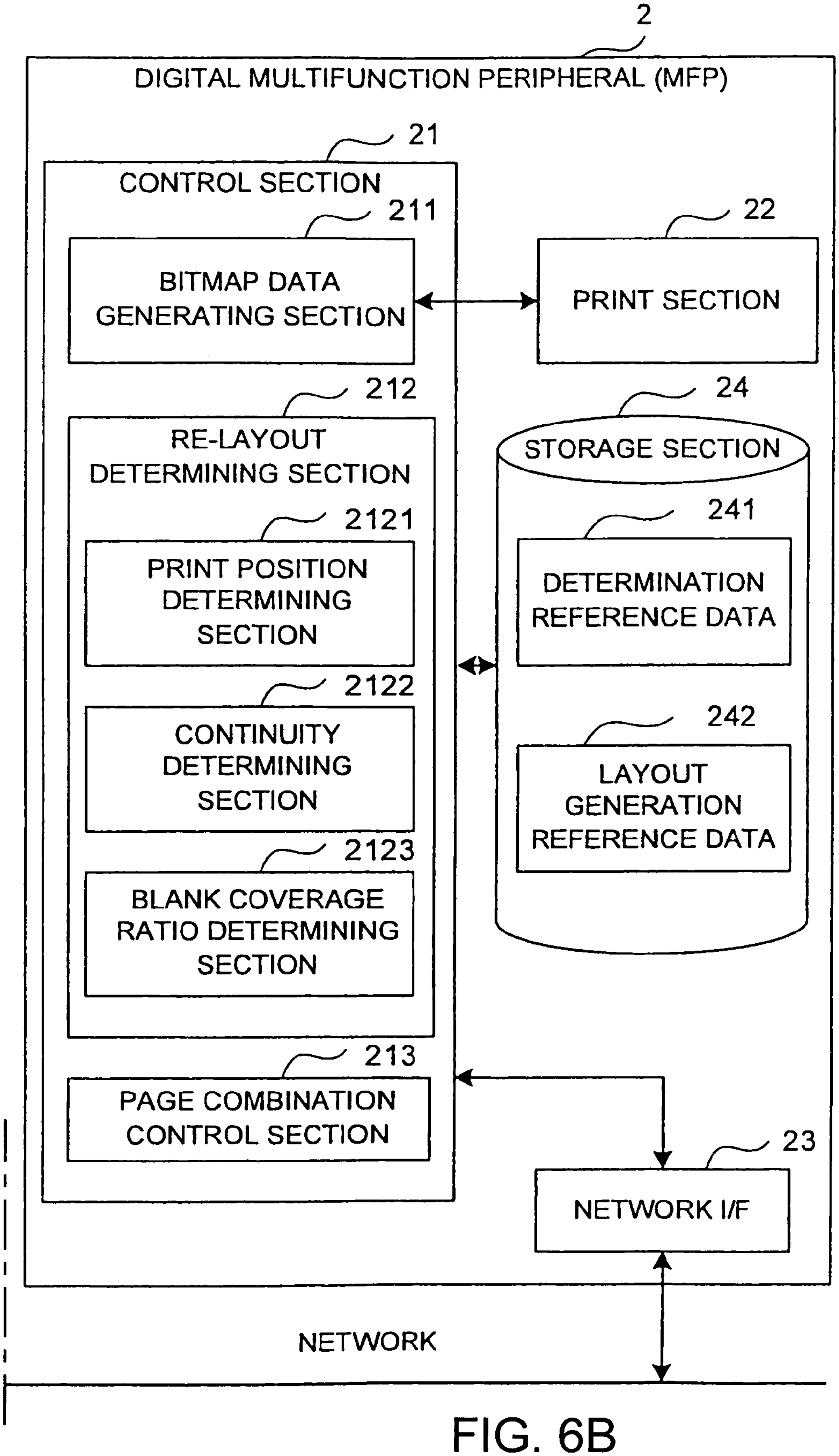

FIG. 6 is an explanatory view showing a manner different from FIG. 1. In the configuration of FIG. 6, the re-layout determining section 212 and the page combination control section 213 exist in the control section 21 of the digital multifunction peripheral 2. That is, these functions are realized by the execution of the control program by the CPU of the control section 21. The control program is stored in the storage section 24 in the digital multifunction peripheral 2. The determination reference data and the layout generation reference data are stored in the storage section 24. In FIG. 6, the print data generating section 111 generates print data on the basis of the content of the physical page determined by the layout determining section 114. The generated print data is transmitted to the digital multifunction peripheral 2 through the network. The transmitted print data is received by the digital multifunction peripheral 2 through the network I/F section 23, and temporarily stored in the storage section 24. The blank coverage ratio determining section 2123 determines the blank coverage ratio of each physical page by using the print data stored in the storage section 24. The print position determining section 2121 and the continuity determining section 2122 perform processing by using the print data stored in the storage section 24. The page combination control section 213 demands of the printer driver 11 the print data in which the margin setting and/or the reduction ratio of the image are changed, when the combination of the physical pages are to be carried out. The printer driver 11 rasterizes the target physical page with the layout thereof changed according to the demand so as to generate the print data. The generated print data is transmitted to the digital multifunction peripheral 2. The print data newly generated can be previewed on the display section 12 at the personal computer 1.

<Detail of Procedure of Processes>

Subsequently, the detail of the procedure of the processes of the printer driver 11 will be explained with reference to the flowcharts. FIGS. 2 to 5 are flowcharts showing the example of the procedure of the processes of the printer driver according to the present invention. The flowcharts in FIGS. 2 to 5 presuppose the configuration in FIG. 1. However, it would be easy for a person skilled in the art to apply the procedure to the configuration in FIG. 6 on the basis of these flowcharts, so that the explanation will be made taking FIGS. 2 to 5 as representative examples.

When the CPU of the personal computer 1 functions as the printer driver 11, it starts a process of one print job upon the receipt of the instruction for starting the printing. At step S11, it confirms the instruction for starting the printing. When the acquired command or parameter is inappropriate (when the result of the determination at step S11 is No), the CPU ends the program without doing anything. On the other hand, when it is confirmed that the appropriate instruction is issued (when the result of the determination at step S11 is Yes), the CPU acquires the data of the logical page, which should be printed, from the application program (step S13). The CPU determines the layout of the physical page so as to generate print data by using the acquired data (step S15). The CPU functions as the layout determining section 114 and the print data generating section 111 in step S15. Then, the CPU determines whether or not the logical page included in the print job has a logical page that is divided into plural physical pages (step S17). If there is no corresponding logical page, the routine proceeds to step S21. On the other hand, when there is the corresponding logical page, the determining process for the re-layout (step S19) is executed, and then, the routine proceeds to the step S21. The detail of the re-layout determining process will be described later with reference to FIG. 3. The CPU transmits the print data generated by the printer driver 11 to the digital multifunction peripheral 2 at the step S21, and then, ends the print job.

Figure 3:
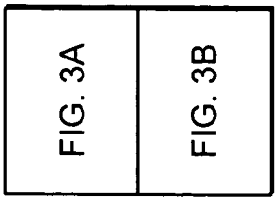
FIG. 3 is a second flowchart showing an example of a procedure of processes of the printer driver according to the present invention.
Figure 3A:
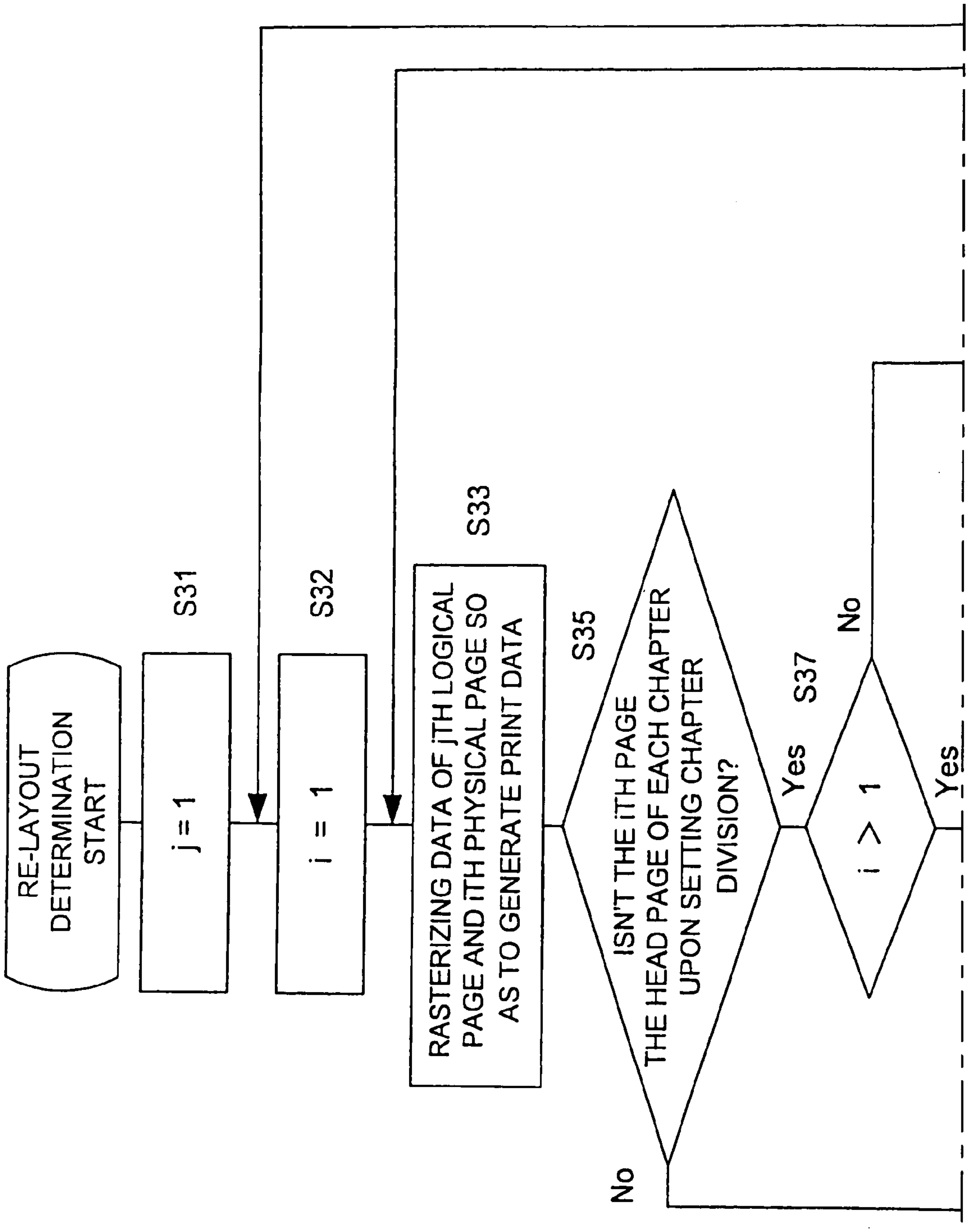
Figure 3B:
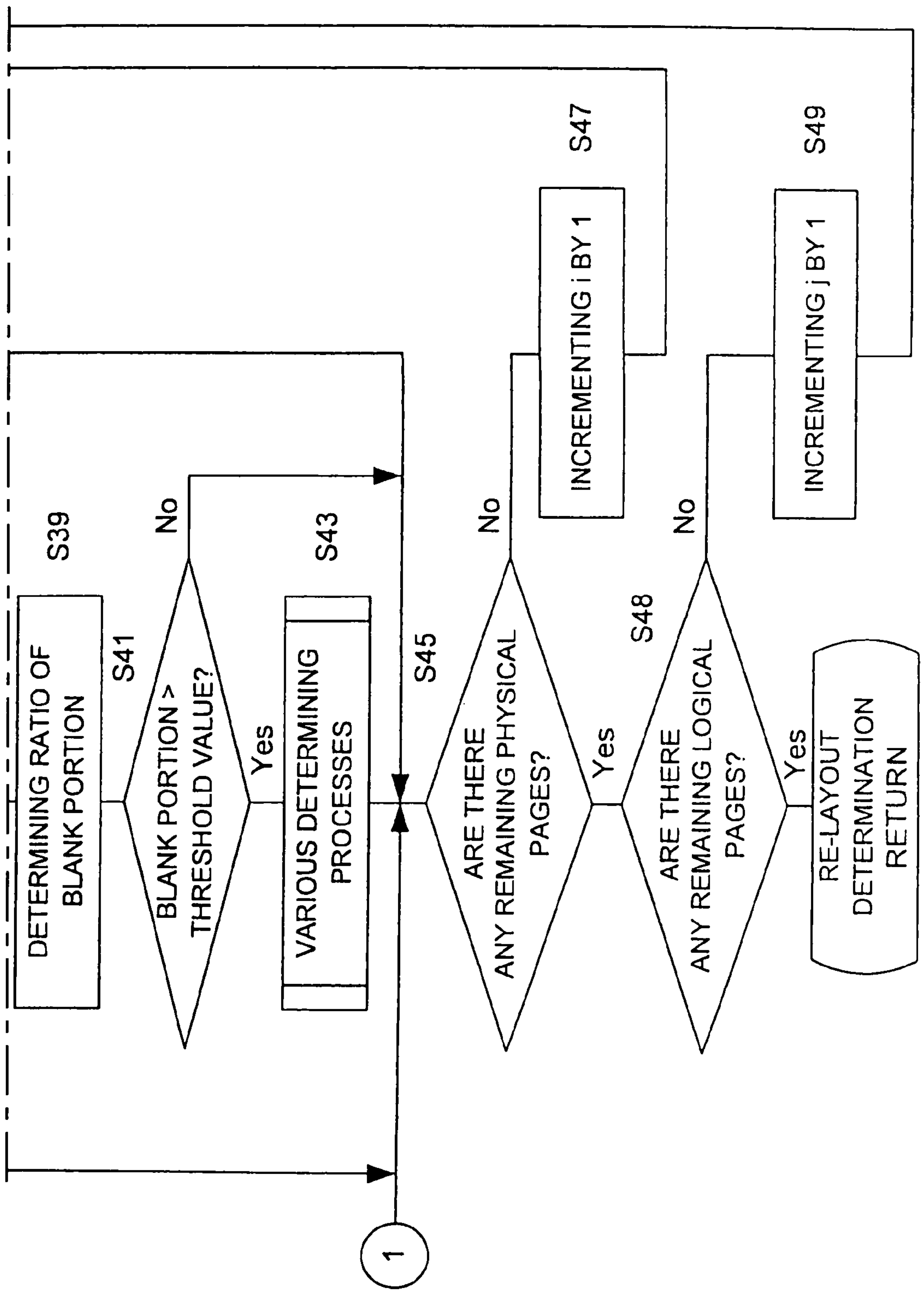

Next, the process of the re-layout determination will be explained. FIG. 3 is a flowchart showing the process of the re-layout determination. In FIG. 3, the CPU firstly initializes a pointer j, which indicates the logical page that is in the print job, to 1 (step S31). Then, the CPU initializes a pointer i, which indicates the physical page in the logical page, to 1 (step S32). Next, the CPU rasterizes the data of the jth logical page and the ith physical page to generate the print data (S33).

In case where the chapter dividing function is effective, the CPU determines whether or not the physical page whose print data is generated corresponds to the head page of each chapter (step S35). The chapter dividing function here is a known function relating to a setting for a printing, and this is a function applied when document data over plural pages is composed of plural chapters. The representative example of this function is the function of being sure to print the head page of the chapter on a front surface of a new page upon the double-sided printing. That is, this is the function in which, even if the preceding chapter ends on the front surface, the back surface of this sheet is daringly made blank, and the head of the next chapter is printed on the front surface of the next sheet. A user may input which page is the head page of each chapter. Alternatively, the CPU may analyze the content of each physical page so as to determine the head page of each chapter.

When the CPU determines that the physical page, which is the subject to be processed, is the head page of each chapter (the determination at step S35 is No), the routine proceeds to a later-described step S45. In this case, the combination with the preceding physical page is not executed. On the other hand, when it is determined that the physical page is not the head page of each chapter, or when the chapter dividing function is not effective, the CPU determines whether or not the physical page, which is the subject to be processed, is the head page of the logical page (step S37). When it is the head of the logical page (when the determination at step S37 is No), the routine proceeds to the later-described step S45. In this case, the combination with the preceding physical page is not executed. If otherwise (when the determination at step S37 is Yes), the CPU determines whether or not the target page should be combined with the preceding physical page.

Specifically, the blank coverage ratio of the physical page, which is the subject to be processed, is calculated (step S39), and the obtained blank coverage ratio is compared to the threshold value stored in the storage section 14 as the determination reference data 141 (step S41). When the blank coverage ratio is not more than the threshold value (when the determination at step S41 is No), the routine proceeds to the later-described step S45. In this case, the combination with the preceding physical page is not executed. When the blank coverage ratio exceeds the threshold value (when the determination at step S41 is Yes), the processes described below are executed as to whether the physical page should be combined or not (step S43). The CPU further determines the content of the physical page, which is the subject to be processes, during the determination processes, and generates the print data obtained by combining the physical page with the preceding physical page, according to need. The detail of the determination processes will be described later with reference to FIG. 4. Thereafter, the routine proceeds to the step S45.

At step S45, the CPU determines whether or not there are remaining physical pages belonging to the logical page (jth page) that is the subject to be processed. When there are remaining pages (when the determination at the step S45 is No), the pointer i is incremented by 1 so as to define the next physical page as the subject to be processed (step S47). Then, the routine proceeds to the step S33, whereby the aforesaid processes are repeated for a physical page that is a new target.

On the other hand, when it is determined that the processes are completed for all physical pages belonging to the logical page that is the subject to be processed at the step S45 (when the determination at the step S45 is Yes), the routine proceeds to step S48.

At step S48, the CPU determines whether or not there are remaining pages in the logical page that is now subject to the printing job. If there are remaining pages (when the determination at the step S48 is No), the pointer j is incremented by 1, and the next logical page is defined as the subject to be processed (step S49). Then, the routine proceeds to the step S32, wherein the processes for the logical page that is defined as the new subject are repeated.

On the other hand, when it is determined that the processes for all logical pages that are now subject to the printing job are completed at the step S48 (when the determination at the step S48 is Yes), the process for the re-layout determination is ended.

Figure 4:
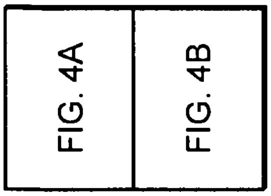
FIG. 4 is a third flowchart showing an example of a procedure of processes of the printer driver according to the present invention.
Figure 4A:
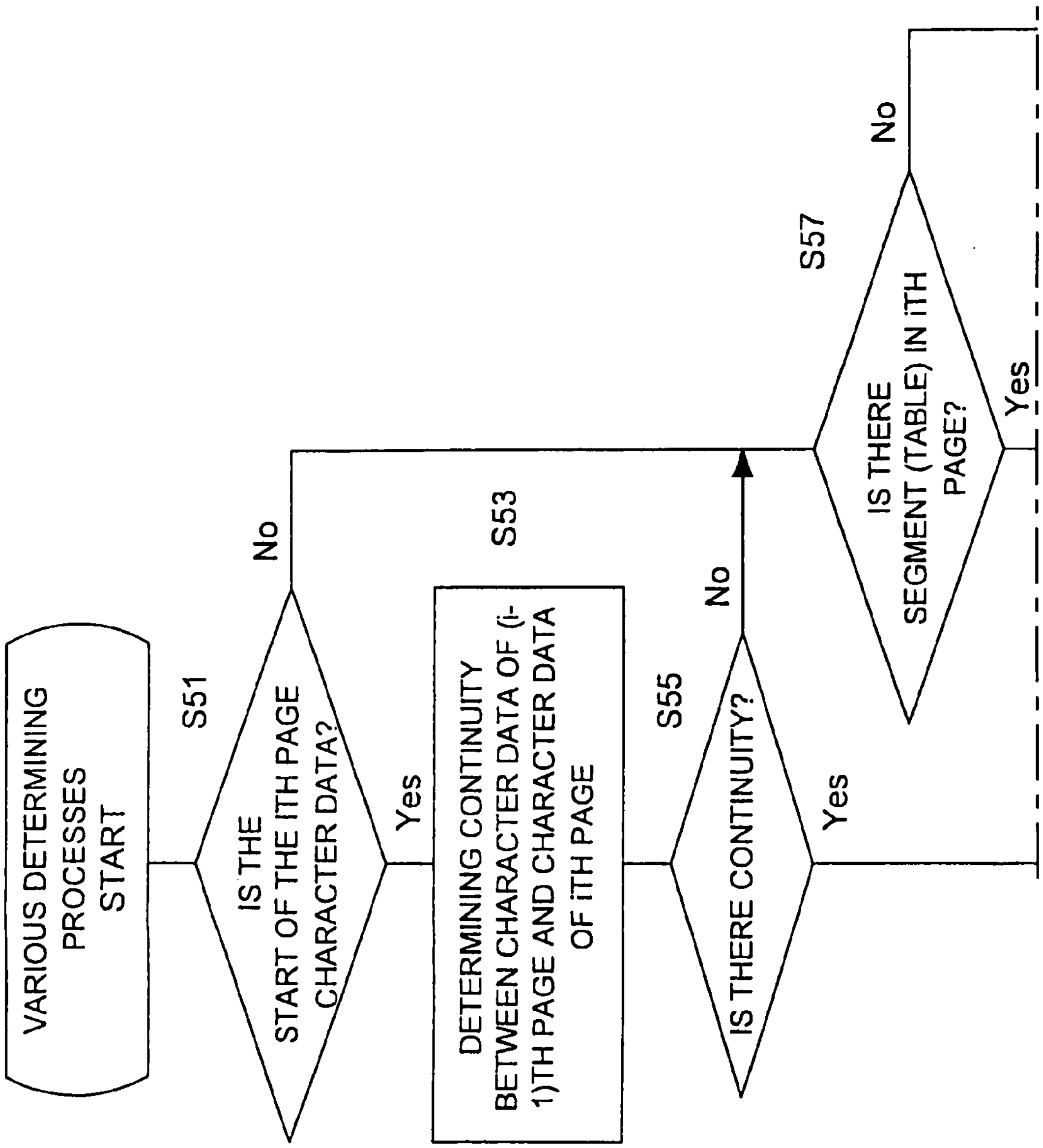
Figure 4B:
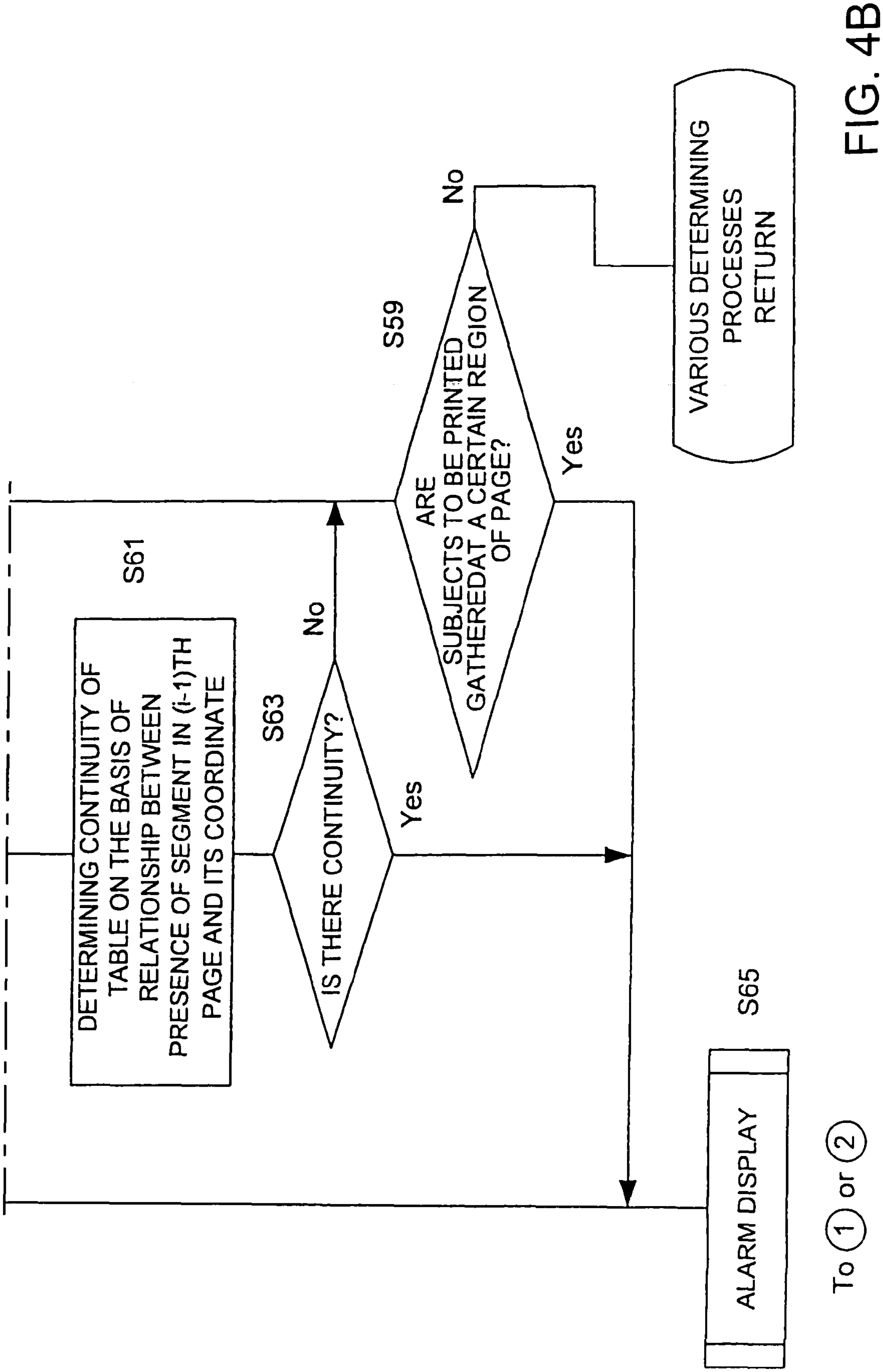

Next, the detail of the various determination processes at the step S43 will be explained. FIG. 4 is a flowchart showing the detail of various determination processes. In FIG. 4, the CPU determines whether or not the physical page, which is the subject to be processed, starts with character data (step S51). That is, it analyzes the character data so as to determine whether the continuity with the preceding page should be determined or not from the character data. If the head data is not the character data (when the determination at the step S51 is No), the routine proceeds to step S57 where it is determined whether or not the physical page, which is the subject to be processed, includes a segment. This is because, when the segment is included, the continuity with the preceding page might be determined with this segment defined as a ruled line of a table.

When the physical page to be processed does not include the segment at step S57 (when the determination is No), the routine further proceeds to step S59 where it is determined whether or not color pixels that are to be printed (pixels not belonging to a blank portion of a background) are present in one region, in the page, having an area not more than a predetermined area. This is because, when the color pixels are gathered in a small region, it is mostly suitable for combining this region with the preceding page.

When the color pixels are not within the region having the area not more than the predetermined area at step S59 (when the determination is No), the CPU ends the various determination processes. In this case, the basis that it is appropriate to combine the physical page to be processed and the preceding page cannot be found. Therefore, the physical page is printed in accordance with the layout determined at the beginning without combining the physical page to be processed with the preceding page.

Figure 10:
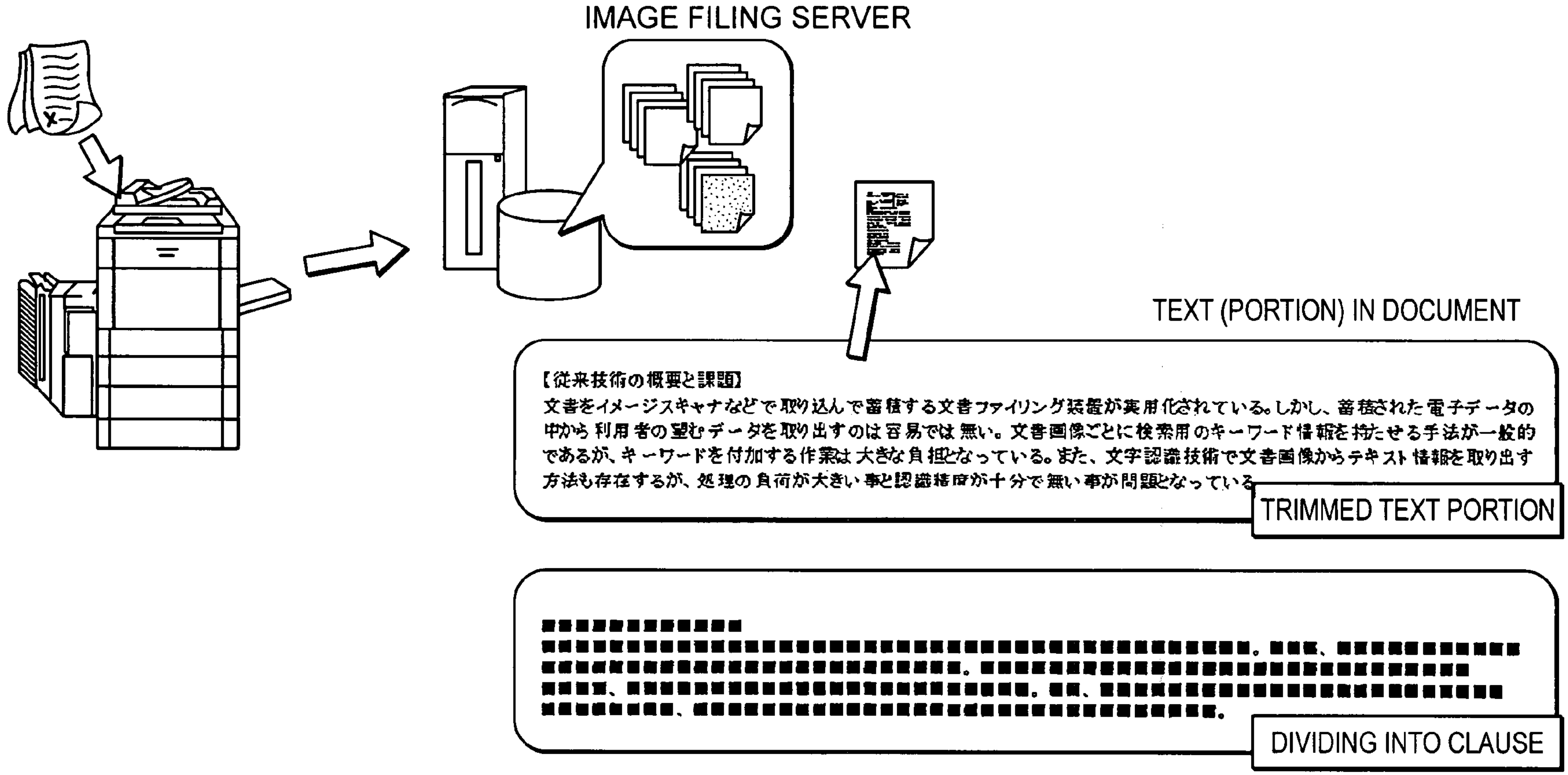
FIG. 10 is an explanatory view for schematically explaining a process for checking as to whether or not a period or a comma is present at the end of character data according to the present invention.

When the head data is the character data at the step S51 (when the determination is Yes), the CPU determines whether or not there is continuity between the physical page and the preceding page by employing the character data (step S53). This is the process for realizing the function of the continuity determining section 1121 in FIG. 1. The determination of the continuity can be carried out as follows, for example. Firstly, the process for reducing the resolution of the physical page to such a degree that the text portion becomes a set of a square or rectangular region corresponding to each character or word is performed, and/or the process for thickening each of the color pixels to be printed is performed. These processes are well known. Since the color pixel is only present at the lower-left side in the character region in the case of a period "." or a comma ",", even by executing these processes, the CPU can identify these characters from the other characters by pattern matching. Therefore, the CPU checks the character data in the preceding page of the physical page to be processed. When the CPU determines that the character data in this page ends in a period or a comma, it determines that this page has no continuity with the next page, i.e., the physical page to be processed. On the other hand, when the character data does not end in a period of a comma, the CPU determines that there is continuity with the next page. FIG. 10 is an explanatory view for explaining the outline of the process for checking as to whether or not there is a period or a comma at the end of the character data.

There has been a known method in a technical field of a character recognition in which a text region is estimated in a page and its arrangement direction (vertical writing or horizontal writing) is estimated. The CPU can estimate the position of the end of the text region according to these techniques. Forming the text portion in a rectangular shape as described above is for reducing the processing time taken for the determination of a period and comma. This process is not always necessary.

It is determined whether or not there is continuity between the physical page to be processed and the preceding physical page from the result of the process at the step S53 (step S55). When it is determined that there is no continuity (when the determination at the step S55 is No), the routine proceeds to step S57 where the CPU attempts to execute the determination on the basis of the segment. On the other hand, when it is determined that there is continuity at the step S55, the CPU displays on the display section 12 the proposal indicating that it is better to combine the physical page to be processed with the preceding physical page, thereby letting a user to know this proposal. This is a routine of an alarm display (step S65). The CPU not only displays the message, but also generates the print data by combining the physical page to be processed with the preceding physical page and displays on the display section 12 the resultant layout. The print data in which the physical page to be processed and the preceding page are combined is combined print data in the claims. The layout displayed on the display section 12 is a combined layout in the claims. The detail of the alarm display process will be described later with reference to FIG. 5. FIGS. 7A and 7B are explanatory views showing an example of layouts when the pages are combined as a result of the determination on the basis of the text region. FIG. 7A shows the layout before the combination, while FIG. 7B shows the layout after the combination.

Returning back to FIG. 4, the process for determining the continuity of pages on the basis of a segment will next be explained. In case where plural segments are present at the head of the physical page to be processed, and some segments extend parallel to the vertical direction while the other segments extend in parallel to the horizontal direction, these segments are estimated as ruled liens of a table. In this case, it is checked whether or not the ruled line of the table is included at the end of the preceding page of the physical page to be processed. When the ruled lines are included at the end of the preceding page, the degree of coincidence is determined. When the X coordinate of the segments extending in the vertical direction coincide with each other in both pages, or when the Y coordinate of the segments extending in the lateral direction coincide with each other in both pages, it is determined that there is continuity between both pages. The process described above corresponds to the step S61. The step S61 is a process for realizing the function as the continuity determining section 1122 in FIG. 1. When the X coordinate of the segments extending in the vertical direction substantially coincide with each other in both pages, both pages are combined in the vertical direction. When the Y coordinate of the segments extending in the horizontal direction substantially coincide with each other in both pages, both pages are combined in the horizontal direction.

FIGS. 8A and 8B are explanatory views showing an example of layouts when the pages are combined as a result of the determination on the basis of the segments. FIG. 8A shows the layout before the combination, while FIG. 8B shows the layout after the combination. The physical page to be processed is the page indicated at the right side in FIG. 8A. This page has two segments extending in the horizontal direction and three segments extending in the vertical direction. The segments extending in the vertical direction are indicated as L1, L2 and L3. The preceding physical page of this physical page is illustrated at the left side. The preceding page has twelve segments extending in the horizontal direction and three segments extending in the vertical direction. The segments extending in the vertical direction are indicated as L4, L5, and L6. As a result of the check for the Y coordinate of the segments extending in the horizontal direction in both pages, it is found that there are a few segments whose Y coordinate coincides with each other. In FIG. 8A, only the segment at the lower part of the page illustrated at the right side substantially corresponds to one segment of the segments in the page illustrated at the left side, while the other segments do not correspond. On the other hand, when the X coordinate of the segments extending in the vertical direction in both pages are checked, the X coordinate of the segments L1 and L4, the segments L2 and L5, and the segments L3 and L6 substantially coincide with each other. Moreover, the text region is not present in the region below the region having the segments in the page at the left side, while the text region is not present in the region below the region having the segments in the page at the right side. Therefore, the CPU determines that it is appropriate to combine both pages in the vertical direction.

When the CPU determines that there is continuity as a result of the determination of the continuity on the basis of the segment as described above (when the determination at the step S63 is Yes), the routine proceeds to the alarm display at the step S65. On the other hand, when the CPU determines that there is no continuity (when the determination at the step S63 is No), the routine proceeds to the above-mentioned step S59, where the continuity is determined on the basis of the arrangement of the color pixels that are to be printed.

Figure 9B:
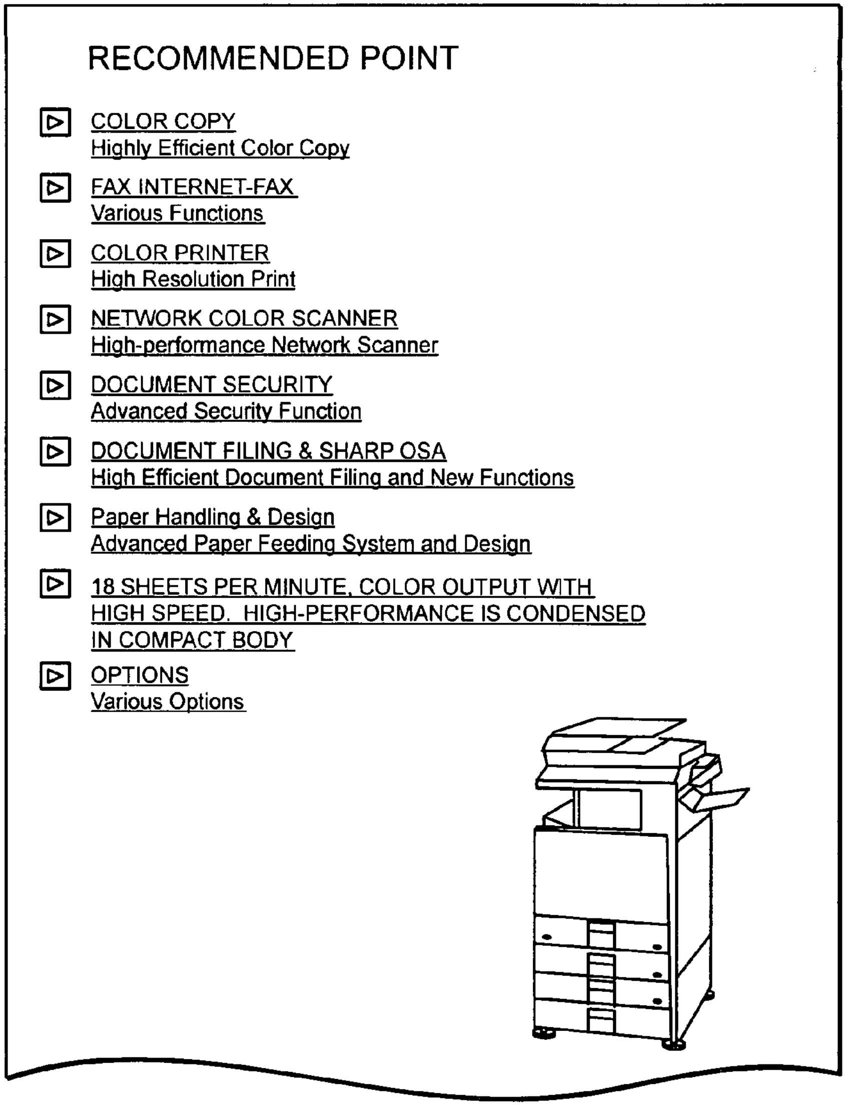

The detail of the step S59 will be explained. FIGS. 9A and 9B are explanatory views showing an example of the case in which the color pixels to be printed are present in a part of a logical page, the color pixels having an area not more than the predetermined area. FIG. 9A is the layout before the combination, while FIG. 9B is the layout after the combination. The page illustrated at the left side in FIG. 9A is the physical page to be processed. The page illustrated at the right side is the preceding physical page. The page at the right side has a photograph (image) of a machine, and the region other than the photograph is blank. When the area of the image is smaller than the predetermined area, only this image is combined with the preceding page. Specifically, the region where the color pixels are present is trimmed in a rectangular region, and when the area thereof is smaller than the predetermined area, the preceding page and this rectangular region are combined. FIG. 9B is the result of the combination. The process at the step S59 is a process for realizing the function of the print position determining section 1121 in FIG. 1.

Figure 5B:
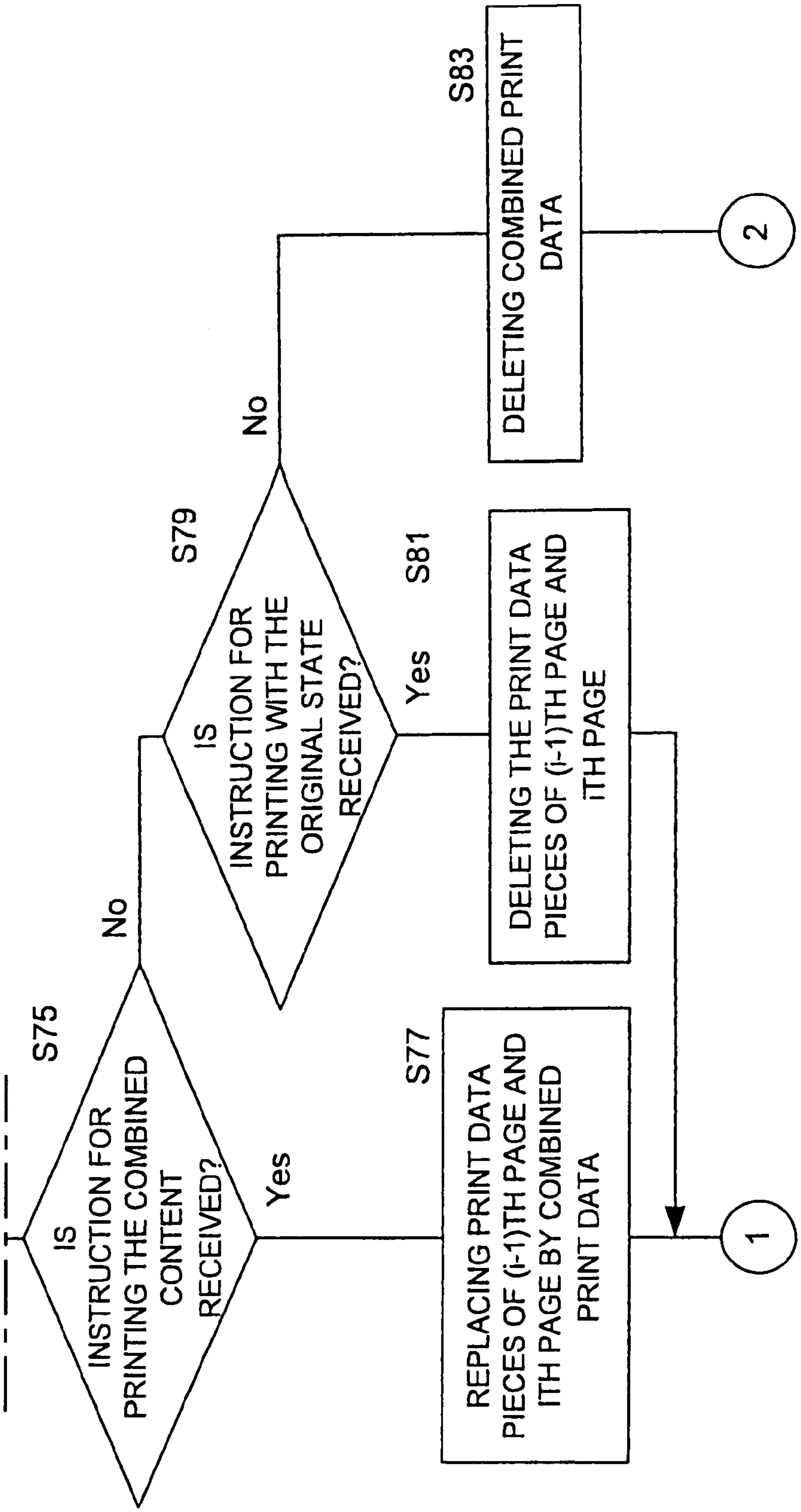
FIG. 5 is a fourth flowchart showing an example of a procedure of processes of the printer driver according to the present invention.

Finally, FIG. 5 will be explained. FIG. 5 is a flowchart showing the procedure of the alarm display. In FIG. 5, the CPU executes the following process with the physical page to be processed and the preceding physical page defined as subjects. Firstly, the margin setting of the physical page is set smaller than the current set value so as to produce the print data (combined print data) in which both pages are combined to form one page (step S71). This is the process for realizing the function of the margin setting section 1142 in FIG. 1.

For example, when both pages are composed of only text data in horizontal writing, the line number that falls within one page is increased, if the upper and lower margins are set small, and this provides possibility of being capable of combining both pages. If the right and left margins are set small, the number of characters in one line increases, and according to this, the line feed of a sentence is adjusted. Consequently, both pages might be able to be combined. It is to be noted that, when the ruled lines of a table that are out of range are combined, no effect is provided unless the margin in the direction in which the ruled lines are out of range is reduced. The CPU may determine the set value of the margin according to the area to be printed in the physical page to be processed. Alternatively, the margin setting may stepwisely be reduced so as to find the setting by which both pages fall within one page.

Instead of setting the margin to be small, or in addition to the margin setting to be small, the printed image in both pages may be reduced. This is the process for realizing the function as the reduction ratio setting section 1141 in FIG. 1. The CPU may determine the reduction ratio according to the area of the region to be printed in the physical page to be processed. Alternatively, the image may be stepwisely reduced so as to find the setting by which both pages fall within on page.

Then, the CPU displays the preview screen of the combined print data on the display section 12, and further, displays the message for confirming whether or not the (i−1)th page and ith page are combined (step S73). The CPU causes a user to confirm the layout of the combined page on the displayed preview screen. Then, the CPU causes a user to input the instruction by using the instruction acquiring section 13.

When receiving the inputted instruction, the CPU confirms the content of this instruction (step S75). If it is the instruction for performing the printing with the combined page (when the result of the determination at step S75 is Yes), the print data pieces of (i−1)th page and ith page are replaced by the combined print data. The print data pieces of (i−1)th page and ith page are deleted (step S77). On the other hand, when the instruction for printing both pages as unchanged without combining both pages (when the result of the determination at step S79 is Yes), the print data pieces are not replaced, and the combined print data is deleted (step S81).

The instruction other than the aforesaid instructions (when the result of the determination at step S79 is No) is the instruction for canceling the process of the printing job. In this case, the execution of the printing job is canceled (step S83).

As described above, the printer driver 11 determines the content of the printing of the physical page, and if there are combinable pages, the printer driver 11 presents this situation and the combined layout to a user so as to cause the user to select.

Various modifications are possible for the present invention other than the aforesaid embodiment. It should not be construed that the modifications do not belong to the scope of the present invention. The present invention should include the meaning equivalent to the claims and all modifications within the scope of the present invention.

What is claimed is:

1. A program embodied in a non-transitory computer-readable medium capable of execution by a CPU for causing an information processing apparatus to function as a printer driver, the program comprisingthat comprises:

a layout determining section that acquires data of a document page (logical page) from an application program and determines a layout of one or more printing pages (physical pages) by allocating contents of the logical page represented by the acquired data to the physical page(s);

a re-layout determining section that determines whether the determined layout includes an a combinable physical page or not, the combinable physical page being capable of being combined with an immediately preceding physical page, based on whether a blank coverage ratio defined as a ratio of a blank area in the physical page exceeds a predetermined threshold value or not and based on presence/absence of continuity in contents between the physical page and the immediately preceding physical page or based on an arrangement characteristic of a non-blank area in the physical page, when one logical page is allocated to plural physical pages;

a page combination control section that causes the layout determining section to determine a combined layout by re-allocating the contents of the combinable physical page and the immediately preceding physical page into a single physical page when the re-layout determining section determines that the determined layout includes the combinable physical page;

a print data generating section for generating print data of the physical page(s) based on the determined layout or the combined layout, and a communication section for transmitting the generated print data to an external image forming apparatus connected via communication, wherein when the combinable physical page and the immediately preceding physical page contain character data, the re-layout determining section determines the presence of continuity in the case that the end of the character data in the immediately preceding physical page is a break of a sentence or a clause.

2. A program embodied in a non-transitory computer-readable medium capable of execution by a CPU for causing an information processing apparatus to function as a printer driver, the program comprising:

a layout determining section that acquires data of a document page (logical page) from an application program and determines a layout of one or more printing pages (physical pages) by allocating contents of the logical page represented by the acquired data to the physical page(s);

a re-layout determining section that determines whether the determined layout includes an a combinable physical page or not, the combinable physical page being capable of being combined with an immediately preceding physical page, based on whether a blank coverage ratio defined as a ratio of a blank area in the physical page exceeds a predetermined threshold value or not and based on presence/absence of continuity in contents between the physical page and the immediately preceding physical page or based on an arrangement characteristic of a non-blank area in the physical page, when one logical page is allocated to plural physical pages;

a page combination control section that causes the layout determining section to determine a combined layout by re-allocating the contents of the combinable physical page and the immediately preceding physical page into a single physical page when the re-layout determining section determines that the determined layout includes the combinable physical page;

a print data generating section for generating print data of the physical page(s) based on the determined layout or the combined layout, and a communication section for transmitting the generated print data to an external image forming apparatus connected via communication, wherein the information processing apparatus includes:

an instruction acquiring section that acquires an instruction from a user; and a display section that can display the layout of the physical page corresponding to the generated print data, the layout determining section acquires the data of the logical page in response to acquisition of the instruction for printing by the instruction acquiring section, the page combination control section causes the display section to display the combined layout so as to prompt the user to issue the instruction as to whether or not to perform the printing with the combined layout, and when the instruction for performing the printing with the combined layout is acquired, the page combination control section exercises control to cause the communication section to transmit print data based on the combined layout in response to the instruction, while when the instruction for not performing the printing with the combined layout, it exercises control to cause the communication section to transmit the print data based on the layout determined for each physical page before the determination of the combined layout;

wherein the layout determining section carries out the re-layout with a margin of a target physical page set to be smaller, or carries out the re-layout with the magnification of an image in the target physical page more reduced, upon determining the combined layout; and wherein the page combination control section causes the layout determining section to determine plural combined layouts, each having different margin setting or different magnification of an image, causes the print data generating section to generate combined print data corresponding to each of the combined layouts, causes the display section to display the combined layouts so as to prompt the user to select any one of the combined layouts, and causes the communication section to transmit the combined print data corresponding to the combined layout selected by the user.

3. The program according to claim 2, wherein when the combinable physical page and the immediately preceding physical page contain segment data, the re-layout determining section estimates whether or not the segment data pieces in both the pages are ruled lines, and when it estimates that the segment data pieces are ruled lines, it checks a degree of coincidence in the arrangement in a vertical direction and a horizontal direction so as to determine the presence/absence of continuity on the basis of the result.

4. The program according to claim 2, wherein the page combination control section causes printing only of the physical page corresponding to the combined layout selected by the user, and then, causes the display section to display a message for prompting the user to select consent or re-selection, and when the instruction acquiring section acquires the instruction for performing the re-selection, the page combination control section controls the display section to display again each of the combined layouts.

5. A program embodied in a non-transitory computer-readable medium capable of execution by a CPU for causing an information processing apparatus to function as a printer driver, the program comprisingthat comprises:

a layout determining section that acquires data of a document page (logical page) from an application program and determines a layout of one or more printing pages (physical pages) by allocating contents of the logical page represented by the acquired data to the physical page(s);

a re-layout determining section that determines whether the determined layout includes an a combinable physical page or not, the combinable physical page being capable of being combined with an immediately preceding physical page, based on whether a blank coverage ratio defined as a ratio of a blank area in the physical page exceeds a predetermined threshold value or not and based on presence/absence of continuity in contents between the physical page and the immediately preceding physical page or based on an arrangement characteristic of a non-blank area in the physical page, when one logical page is allocated to plural physical pages;

a page combination control section that causes the layout determining section to determine a combined layout by re-allocating the contents of the combinable physical page and the immediately preceding physical page into a single physical page when the re-layout determining section determines that the determined layout includes the combinable physical page;

a print data generating section for generating print data of the physical page(s) based on the determined layout or the combined layout;

a communication section for transmitting the generated print data to an external image forming apparatus connected via communication; and a chapter dividing function that allows, when a subject to be printed is composed of plural logical pages, a user to designate whether or not each of the logical pages is a head of a chapter indicating a substantial break of a text, or that causes a computer to identify whether or not each of the logical pages is a head of a chapter by using the data of each of the logical pages, wherein the page combination control section exercises control such that the physical page to which the head of each chapter is allocated is excluded from the subject for determining the layout combined with the immediately preceding physical page.

6. An image forming apparatus comprising:

a communication section that is connected via communication to an information processing apparatus in which a printer driver determines a layout of one or more printing pages (physical pages) by allocating contents of a document page (logical page) represented by data acquired from an application program to one or more printing pages (physical pages) and generates print data for every physical page, and receives the print data generated by the printer driver;

a re-layout determining section that determines whether the determined layout includes a combinable physical page or not, the combinable physical page being capable of being combined with an immediately preceding physical page, based on whether a blank coverage ratio defined as a ratio of a blank area in the physical page and based on presence/absence of continuity in contents between the physical page and the immediately preceding physical page or based on an arrangement characteristic of a non-blank area in the physical page, when one logical page is allocated to plural physical pages; and a page combination control section that demands of the printer driver to generate combined print data based on a combined layout that is obtained by re-allocating the contents of the combinable physical page and the immediately preceding physical page to a single physical page, and exercises control to receive the generated combined print data from the printer driver and print the same when the re-layout determining section determines that the determined layout includes the combinable physical page, wherein when the combinable physical page and the immediately preceding physical page contain character data, the re-layout determining section decides the presence of continuity in the case that the end of the character data in the immediately preceding physical page is a break of a sentence or a clause.

7. An image forming apparatus comprising:

a communication section that is connected via communication to an information processing apparatus in which a printer driver determines a layout of one or more printing pages (physical pages) by allocating contents of a document page (logical page) represented by data acquired from an application program to one or more printing pages (physical pages) and generates print data for every physical page, and receives the print data generated by the printer driver;

a re-layout determining section that determines whether the determined layout includes a combinable physical page or not, the combinable physical page being capable of being combined with an immediately preceding physical page, based on whether a blank coverage ratio defined as a ratio of a blank area in the physical page and based on presence/absence of continuity in contents between the physical page and the immediately preceding physical page or based on an arrangement characteristic of a non-blank area in the physical page, when one logical page is allocated to plural physical pages;

a page combination control section that demands of the printer driver to generate combined print data based on a combined layout that is obtained by re-allocating the contents of the combinable physical page and the immediately preceding physical page to a single physical page, and exercises control to receive the generated combined print data from the printer driver and print the same when the re-layout determining section determines that the determined layout includes the combinable physical page;

an instruction acquiring section that acquires an instruction from a user; and a display section that can display the layout of the physical page corresponding to the received print data, wherein the page combination control section causes the display section to display the combined layout so as to prompt the user to issue the instruction as to whether or not to perform the printing with the combined layout, and when the instruction for performing the printing with the combined layout is acquired, the page combination control section exercises control to demand of the printer driver to generate combined print data that is generated based on the combined layout in response to the instruction, receive the generated combined print data from the printer driver, and print the combined print data, while when the instruction for not performing the printing with the combined layout is acquired, the page combination control section exercises control to print the print data, which has already been received, without demanding the combined print data of the printer driver, wherein the printer driver carries out the re-layout with a margin of a target physical page set to be smaller, or carries out the re-layout with the magnification of an image in the target physical page more reduced, upon determining the combined layout, and wherein the page combination control section causes the printer driver to generate plural combined print data pieces, each having different margin setting or different magnification of an image, causes the display section to display each of the combined layouts so as to prompt a user to select any one of the combined layouts, and exercises control to print the combined print data corresponding to the selected combined layout.

8. The image forming apparatus according to claim 7, wherein when the combinable physical page and the immediately preceding physical page contain segment data, the re-layout determining section estimates whether or not the segment data pieces in both the pages are ruled lines, and when it estimates that the segment data pieces are ruled lines, it checks a degree of coincidence in the arrangement in a vertical direction and a horizontal direction so as to determine the presence/absence of continuity on the basis of the result.

9. The image forming apparatus according to claim 7, wherein the page combination control section causes printing only of the physical page corresponding to the combined layout selected by the user, and then, causes the display section to display a message for prompting the user to select consent or re-selection, and when the instruction acquiring section acquires the instruction for performing the re-selection, the page combination control section controls the display section to display again each of the combined layouts.

10. An image forming apparatus comprising:

a communication section that is connected via communication to an information processing apparatus in which a printer driver determines a layout of one or more printing pages (physical pages) by allocating contents of a document page (logical page) represented by data acquired from an application program to one or more printing pages (physical pages) and generates print data for every physical page, and receives the print data generated by the printer driver;

a re-layout determining section that determines whether the determined layout includes a combinable physical page or not, the combinable physical page being capable of being combined with an immediately preceding physical page, based on whether a blank coverage ratio defined as a ratio of a blank area in the physical page and based on presence/absence of continuity in contents between the physical page and the immediately preceding physical page or based on an arrangement characteristic of a non-blank area in the physical page, when one logical page is allocated to plural physical pages; and a page combination control section that demands of the printer driver to generate combined print data based on a combined layout that is obtained by re-allocating the contents of the combinable physical page and the immediately preceding physical page to a single physical page, and exercises control to receive the generated combined print data from the printer driver and print the same when the re-layout determining section determines that the determined layout includes the combinable physical page, the apparatus further comprising a chapter dividing function that allows, when the subject to be printed is composed of plural logical pages, a user to designate whether or not each of the logical pages is a head of a chapter, or that identifies whether or not each of the logical pages is a head of a chapter by using the data of each of the logical pages, wherein the page combination control section exercises control such that the physical page to which the head of each chapter is allocated is excluded from the subject for determining the layout combined with the immediately preceding physical page.

11. An information processing apparatus with a function of generating print data, the apparatus comprising:

a layout determining section that acquires data of a document page (logical page) from an application program and determines a layout of one or more printing pages (physical pages) by allocating contents of the logical page represented by the acquired data to the physical page(s);

a print data generating section for generating print data of the physical page(s) based on the layout of the physical page(s);

a communication section for transmitting the generated print data to an external image forming apparatus connected via communication;

a re-layout determining section that determines whether an interruption of generating print data is carried out or not, on the physical page whose blank coverage ratio calculated as a ratio of a blank area in the physical page is over a predetermined threshold value, based on presence/absence of continuity in contents between the physical page and the immediately preceding physical page or based on an arrangement characteristic of a non-blank area in the physical page, when one logical page is allocated to plural physical pages; and a page combination control section that controls so as to causes the layout determining section to determine a combined layout that is obtained by re-allocating the contents of the physical page and the immediately preceding physical page into a single physical page, to cause the print data generating section to generate a combined print data based on the combined layout, and to cause the communication section to transmit the combined print data, when the re-layout determining section determines an interruption of generating print data;

wherein the information processing apparatus includes:

an instruction acquiring section that acquires an instruction from a user; and a display section that can display the layout of the physical page corresponding to the generated print data, the layout determining section acquires the data of the logical page in response to acquisition of the instruction for printing by the instruction acquiring section, the page combination control section causes the display section to display the combined layout so as to prompt the user to issue the instruction as to whether or not to perform the printing with the combined layout, and when the instruction for performing the printing with the combined layout is acquired, the page combination control section exercises control to cause the communication section to transmit print data based on the combined layout in response to the instruction, while when the instruction for not performing the printing with the combined layout, it exercises control to cause the communication section to transmit the print data based on the layout determined for each physical page before the determination of the combined layout;

wherein the layout determining section carries out the re-layout with a margin of a target physical page set to be smaller, or carries out the re-layout with the magnification of an image in the target physical page more reduced, upon determining the combined layout; and wherein the page combination control section causes the layout determining section to determine plural combined layouts, each having different margin setting or different magnification of an image, causes the print data generating section to generate combined print data corresponding to each of the combined layouts, causes the display section to display the combined layouts so as to prompt the user to select any one of the combined layouts, and causes the communication section to transmit the combined print data corresponding to the combined layout selected by the user.

* * * * *